United States Patent [19]

Rodal

[11] Patent Number: 4,751,586
[45] Date of Patent: Jun. 14, 1988

[54] ROTARY HEAD TAPE TRANSPORT SERVO SYSTEM HAVING HIGH SPEED SERVO LOCK CAPABILITY

[75] Inventor: David R. Rodal, Palo Alto, Calif.

[73] Assignee: Ampex Corporation, Redwood City, Calif.

[21] Appl. No.: 903,851

[22] Filed: Aug. 28, 1986

Related U.S. Application Data

[63] Continuation of Ser. No. 533,379, Sep. 16, 1983, abandoned, which is a continuation-in-part of PCT US82/1,516, Oct. 27, 1982, which is a continuation-in-part of PCT US82/1,284, Sep. 17, 1982.

[51] Int. Cl.⁴ .................... H04N 5/782; G11B 15/00
[52] U.S. Cl. .................................... 358/310; 358/321; 358/338; 360/10.1; 360/10.3; 360/73; 360/74.1; 360/74.4
[58] Field of Search ............... 358/338, 321, 310, 320; 360/10.1, 10.3, 13, 14.1, 14.2, 73, 74.1, 74.4

[56] References Cited

U.S. PATENT DOCUMENTS 4,123,773 10/1978 Rotter et al. .................. 360/10.1
4,139,867 2/1979 Foerster ........................ 360/10.3
4,494,153 1/1985 Ravizza ......................... 360/77 X Primary Examiner—Robert L. Richardson
Attorney, Agent, or Firm—Ralph L. Mossino; Joel D. Talcott; Richard P. Lange

[57] ABSTRACT

A method and apparatus for controlling the capstan servo of a magnetic video tape recording and reproducing machine is disclosed. The invention provides almost instantaneous color framing and synchronous control track lock when accelerating from a very slow tape velocity up to normal velocity. An embodiment of the apparatus also stops the tape at a predetermined position relative to control track transitions when stopping the machine from a noncontrol track lock operating mode, such as shuttle, variable velocity reproducing and jog.

25 Claims, 11 Drawing Sheets

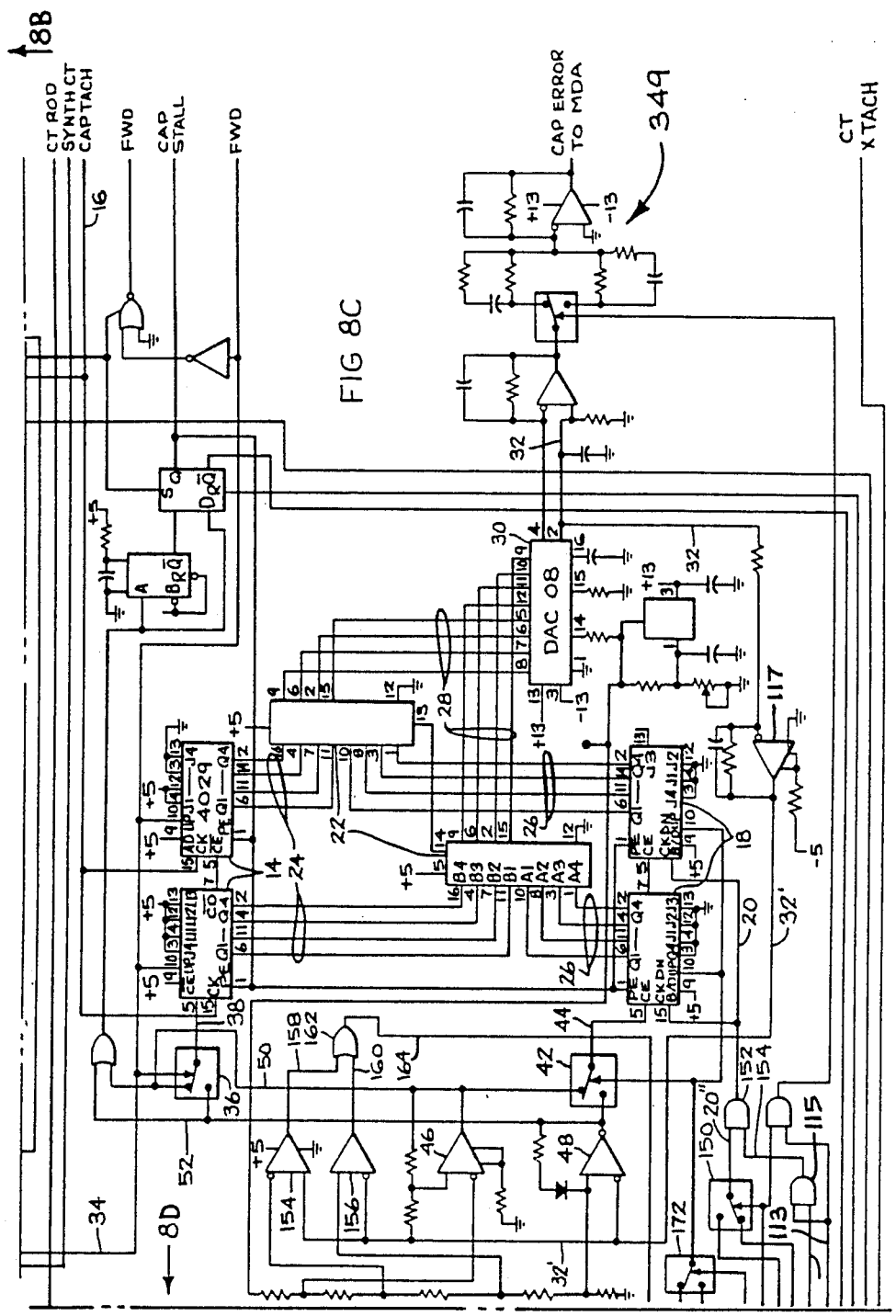

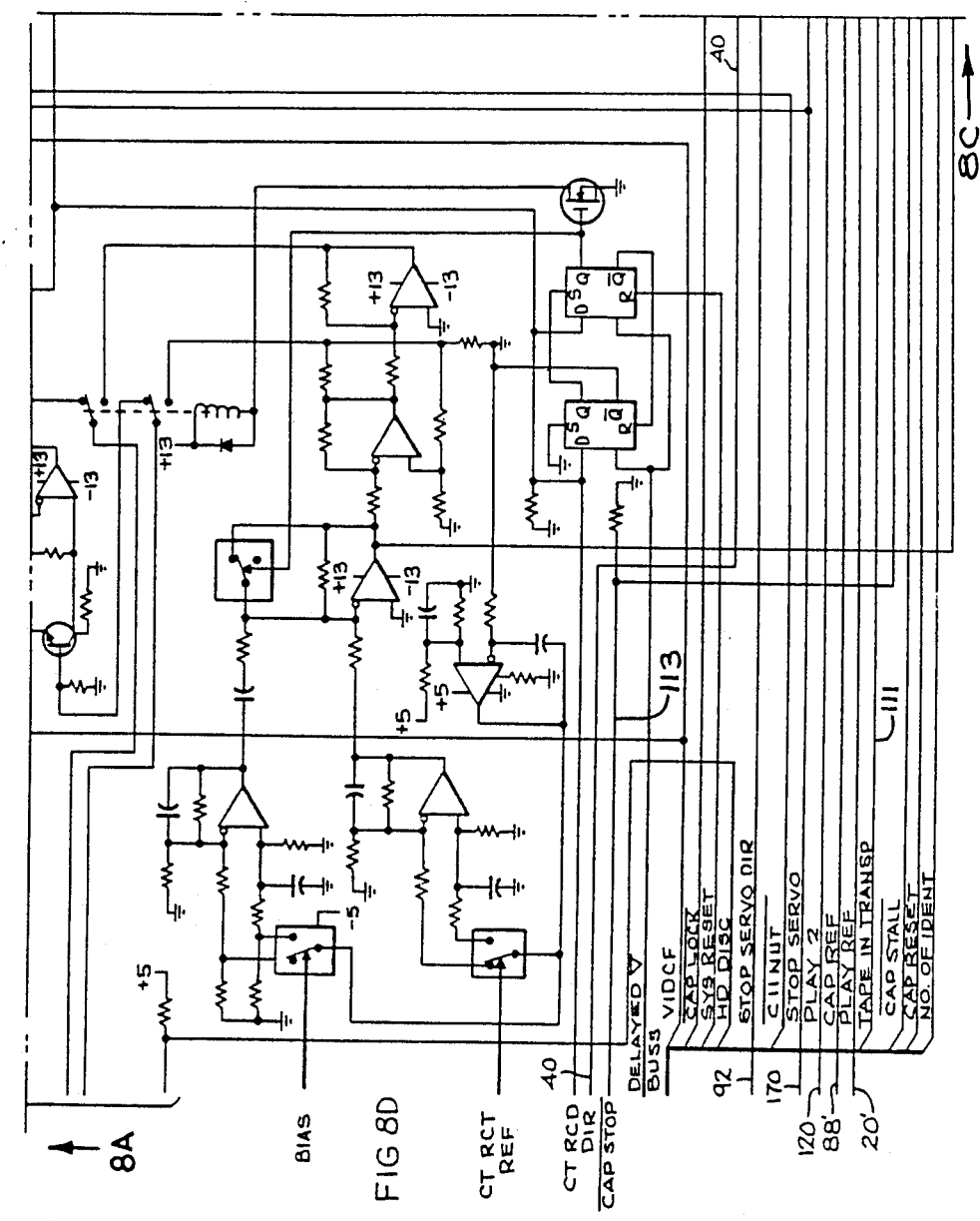

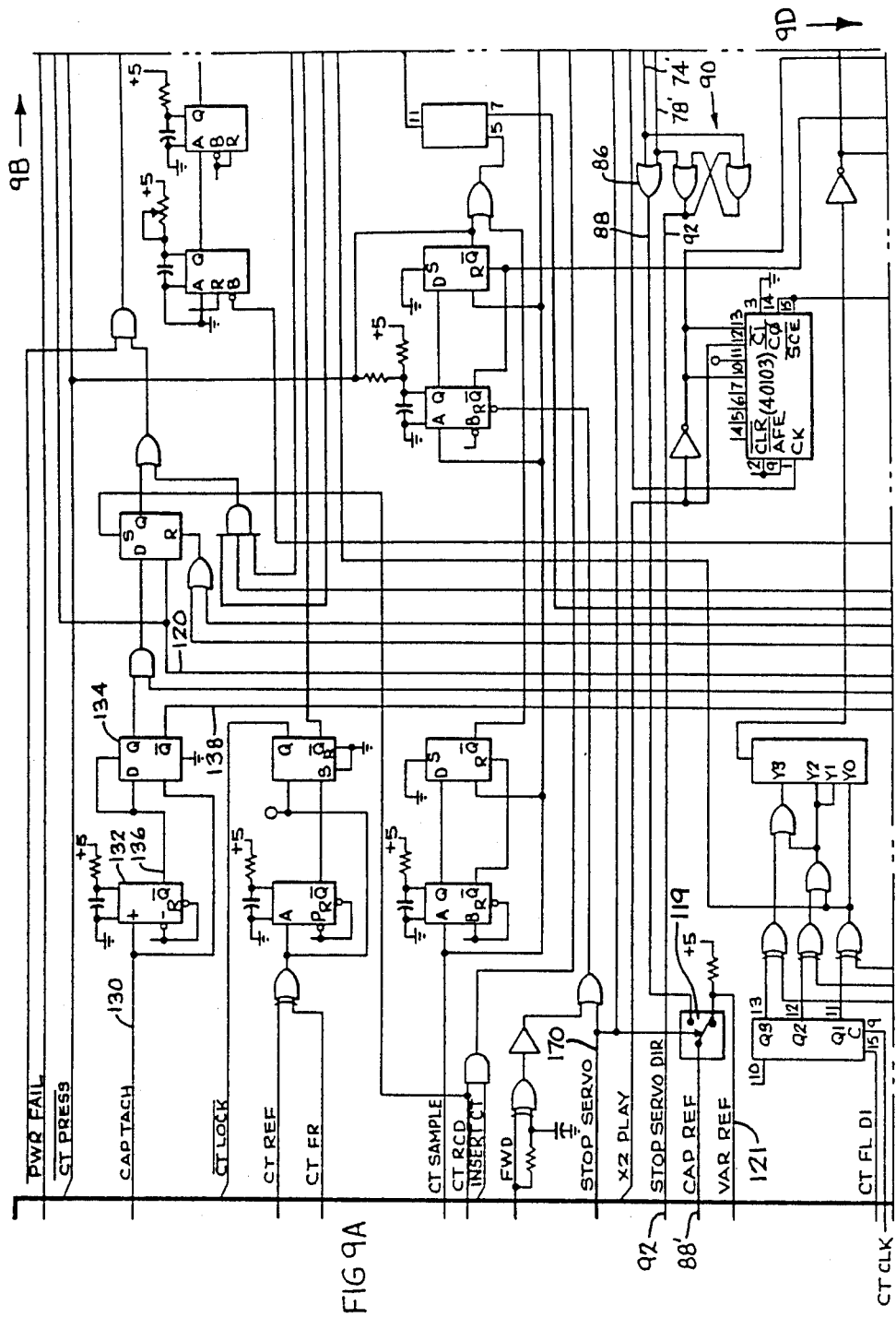

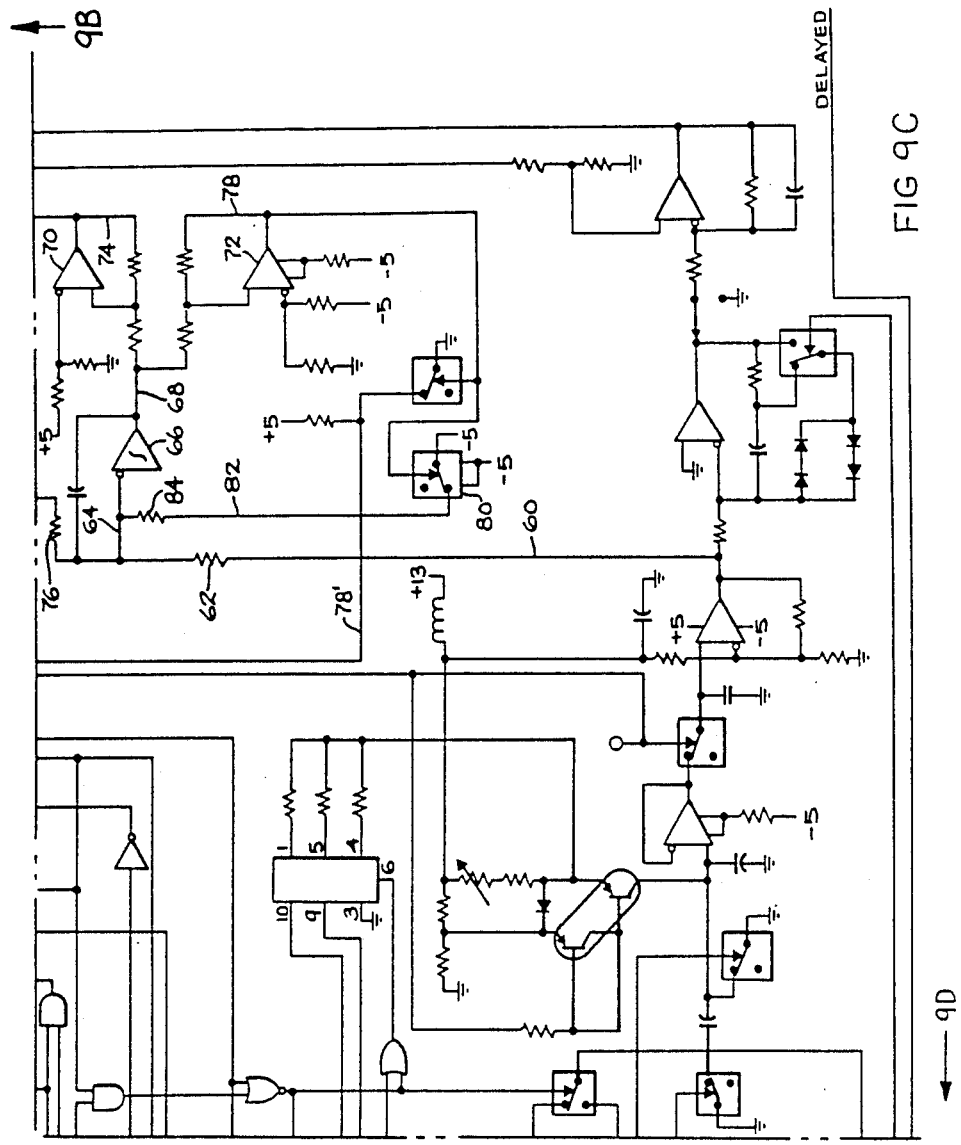

ROTARY HEAD TAPE TRANSPORT SERVO SYSTEM HAVING HIGH SPEED SERVO LOCK CAPABILITY

This is a continuation of copending application Ser. No. 533,379, filed Sept. 16, 1983 and now abandoned, which in turn is a continuation-in-part of International Application under the Patent Cooperation Treaty PCT/US82/01526, filed Oct. 27, 1982, which designated the United States of America, which in turn is a continuation-in-part of International Application under the Patent Cooperation Treaty PCT/US82/01284, now U.S. Pat. No. 4,234,817 filed Sept. 17, 1982, which designated the United States of America.

The present invention generally relates to rotary head tape recording and reproducing apparatus and, more particularly, to a method and apparatus for controlling the transport of a tape during changes in the velocity of tape transport, and in its preferred embodiment, while maintaining tape transport servo lock and reproducing information recorded on the transported tape without the introduction of undesirable timing disturbances in the reproduced information.

When a video tape recording and reproducing apparatus is operated to assemble a video program, it is typically necessary to perform editing operations to formulate the desired program content from various video program sources. In the past, a program has often been assembled using several video recording and reproducing apparatus, and it has been necessary for the operator to synchronize several such apparatus prior to performing an editing operation. If several sources of material are to be used in formulating a video program, several video recording and reproducing apparatus must be placed sequentially in the reproducing mode while one other such apparatus is placed in the record mode to record the material on a single master tape. It has been necessary to perform a pre-roll synchronizing process by operating each of the several program source apparatus in their play or reproducing mode, and then varying the capstan velocity of the source apparatus by executing a "tape velocity override" (TSO) operation in each of the apparatus. As used herein, velocity in contrast to speed means a velocity of displacement of tape with direction significance, unless the context warrants otherwise, and includes zero speed of tape transport. A TSO operation is executed to transport the tape at a velocity different from the normal recording and reproducing velocity, until the recorded time code reproduced from the tape (or color frame signal extracted from reproduced video information) associated with each of the apparatus between which a transfer of program material is to occur is synchronized for synchronous reproduction or recording of video program material. At that time, the recording apparatus is synchronously switched to record segments of the desired program material synchronously reproduced from the program source apparatus. It should be quite apparent that if the operation of all program source apparatus can be rapidly synchronized, i.e., be placed in a color frame control track and capstan tachometer (tach) servo lock operating condition, then editing would be simplified and executed more expeditiously, particularly when several apparatus are being used to supply program source material for recording on the master tape. In a rotary head video tape recording and/or reproducing apparatus, such servo lock operaing condition is achieved when the head is rotating and the tape is being longitudinally transported at desired nominal velocities, respectively, with the rotational or angular position (commonly referred to as phase) of the head synchronized to a particular transition, hence, position (or phase) of the tape, of the control track signal periodically recorded along the longitudinally transported tape. Prior art apparatus often require several seconds to obtain control track servo lock and become color frame synchronized relative to a studio reference timing signal. It should be apparent that if an apparatus can be rapidly accelerated and color frame control track servo locked within a few milliseconds, rather than several seconds, the synchronizing of several apparatus would be facilitated and editing operations would be simplified.

Accordingly, it is the primary object of the present invention to operate a rotary head tape recording and reproducing apparatus to control the transport of a tape during changes in the velocity of tape transport permitting information recorded on the tape to be reproduced with minimum time disturbances and without the loss of information.

More particularly, it is an object of the present invention to operate a rotary head tape recording and reproducing apparatus to virtually synchronize the angular position and velocity of the rotating head (or heads) with respect to a longitudinally transported tape before the tape is transported at the desired longitudinal velocity.

Another object of the present invention is to provide a video tabpe recording and reproducing apparatus that is capable of achieving rapid control track and capstan tach servo lock by acquiring color frame synchronization before executing a tape transport velocity change to the normal record and/or reproduce velocity so as not to lose the acquired color frame synchronization as a result of such velocity change.

Yet another object is to provide an apparatus of the foregoing type which, in its preferred embodiment, accomplishes the color frame synchronization and tape transport velocity change while reproducing recorded video information which upon display is productive of a disturbance-free picture.

Still another object of the present invention is to provide an apparatus of the foregoing type which, when the transported tape is stopped from being transported at a velocity other than zero speed, the deceleration of the tape is initiated precisely with respect to the system controlling reference timing signal, typically the station vertical sync reference signal, so that subsequent acceleration of the tape to normal record and/or reproduce velocity can be achieved with an instantaneous control track servo lock condition.

Yet another object of the present invention is to provide an apparatus of the foregoing type, which when the transported tape is stopped from being transported in a non-color frame control track servo locked mode, e.g., during shuttle, jog or variable velocity reproducing operating modes, it is stopped with an identifiable control track transition location precisely positioned along the path of tape transport with respect to the location of the nominal plane of rotation of the video reproduce head location, so that the transport of the tape can be subsequently started with an instantaneous control track servo lock condition.

A more detailed object of the present invention is to provide an apparatus of the foregoing type, which when the tape is stopped during a still field reproducing mode, or is being transported at a relatively low velocity slow motion reproducing mode, and a normal velocity play command is received, the apparatus delays the acceleration of the tape to normal velocity until a field identification signal extracted from the reproduced video information is coincident with the occurrence of the equivalent field identification signal of a controlling reference and, upon such coincidence, accelerating the transport of the tape to the normal reproduce velocity while maintaining the coincidence condition during such acceleration.

Other objects and advantages will become apparent upon reading the following detailed description, while referring to the attached drawings, in which.

Figure 3:
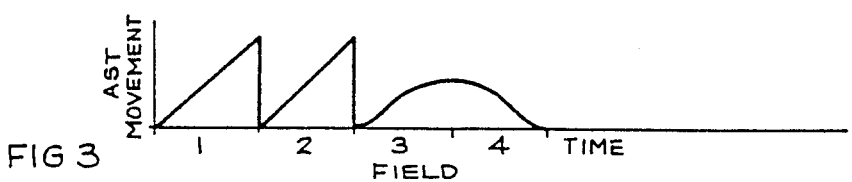
Figure 5:
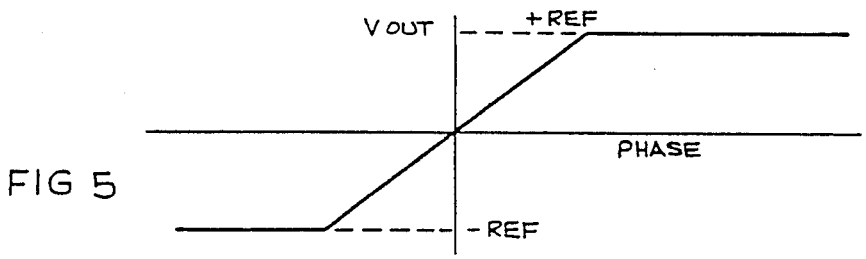
Figure 4:
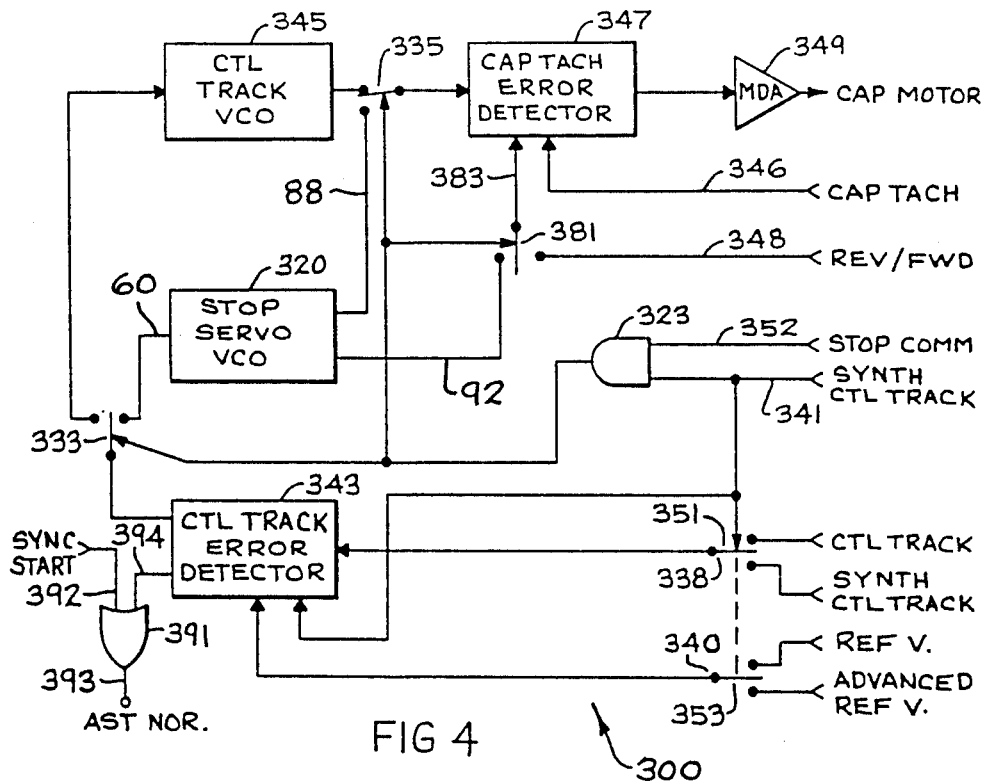
Figure 10:
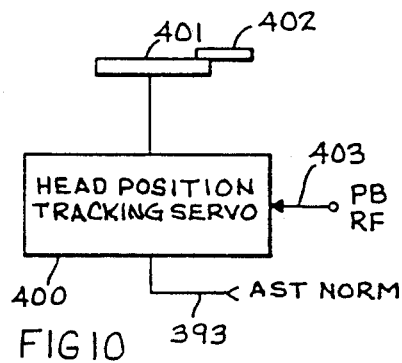
Figure 11:
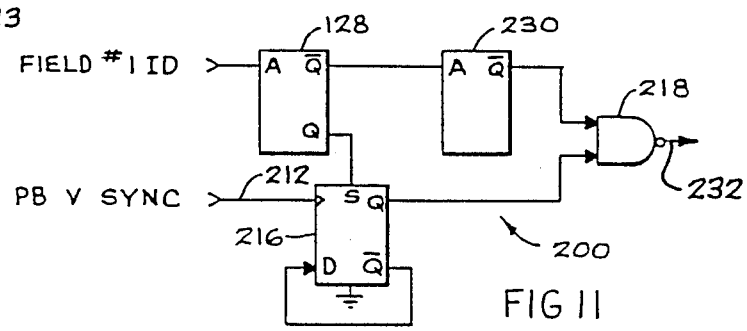
Figure 6:
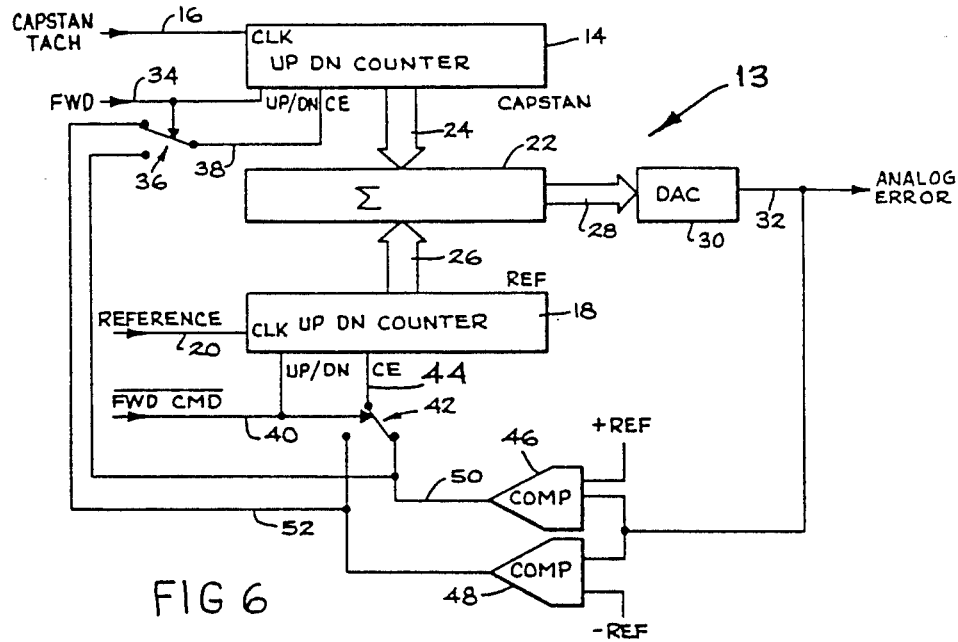
Figure 7:
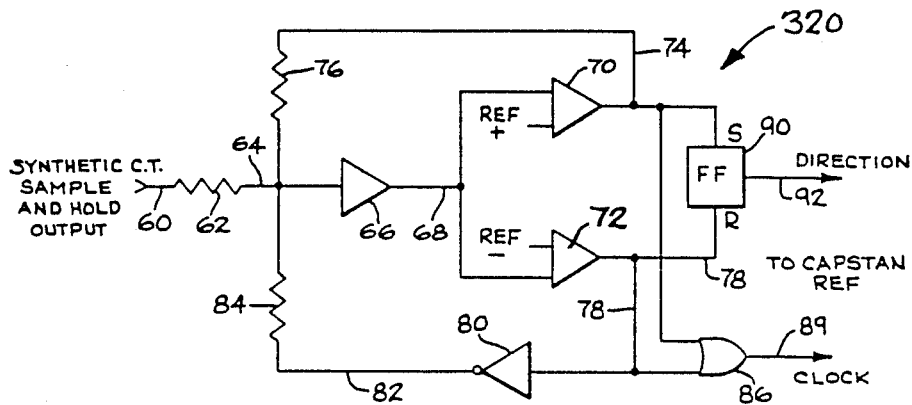
Figure 8A:
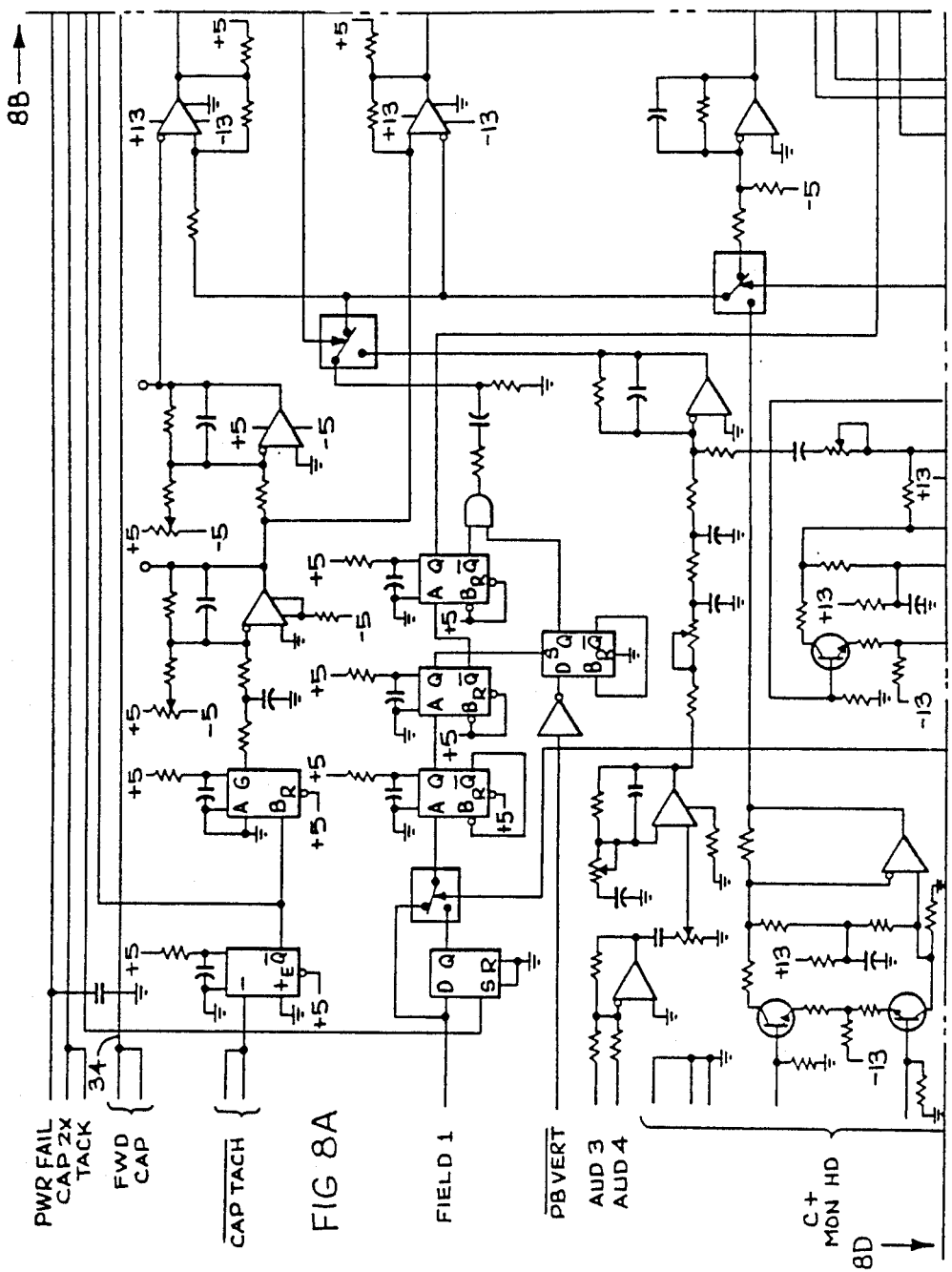
Figure 8B:
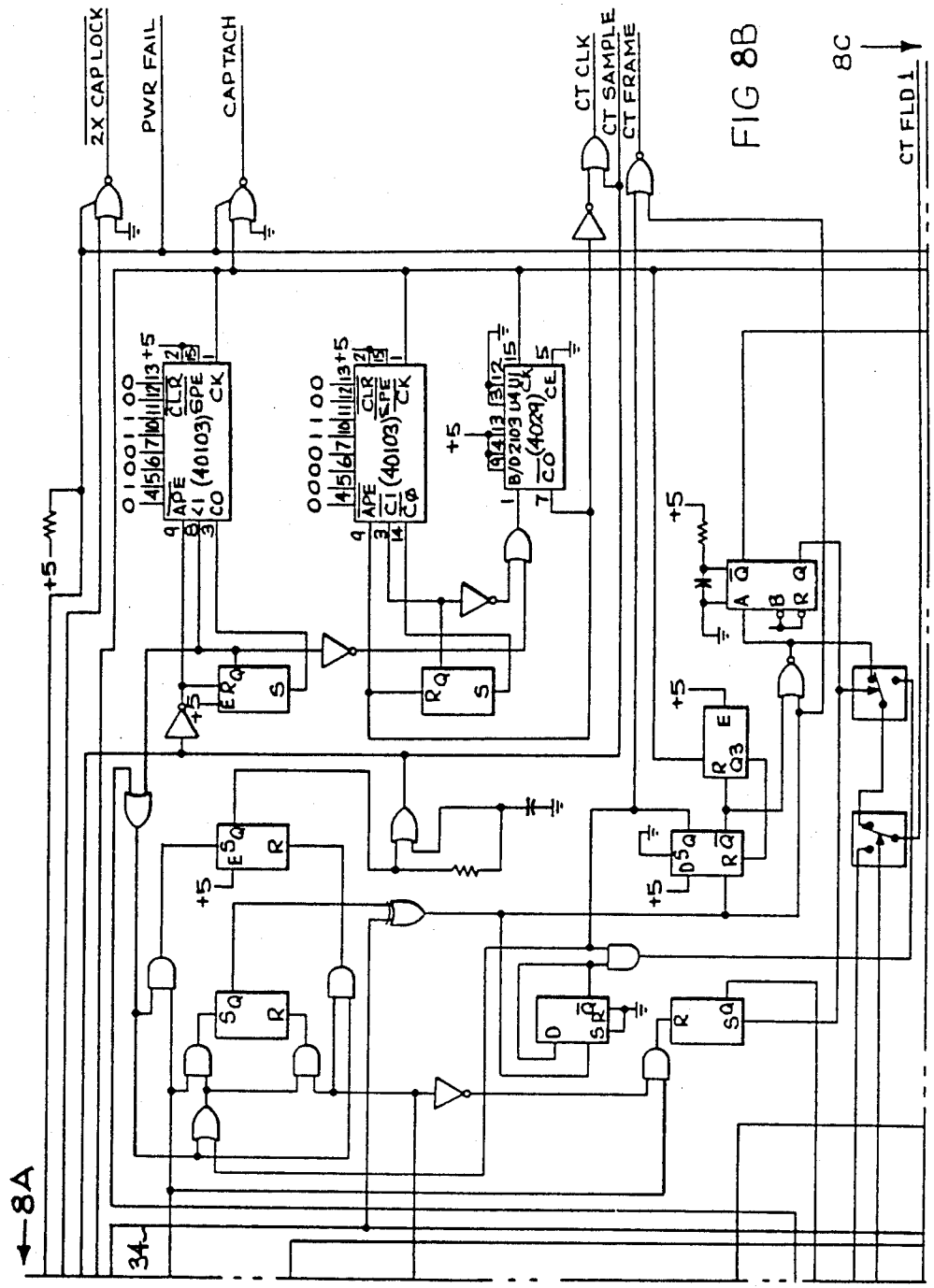

FIG. 3 is a graph of movement of a video head mounted at the end of a movable element which moves the video head transversely relative to the longitudinal direction of a track of recorded video information and shows the displacement of the head by the movable element during illustrated field intervals, with the first two field intervals reproduced while the transport of the tape is stopped, or at zero tape speed, commonly referred to as the still field reproducing mode. The third and fourth field intervals show the displacement required of the head to maintain it registered on a track during acceleration of the transport of the tape from stop to normal reproducing velocity;

FIG. 4 is a functional block diagram of a capstan servo arranged to operate in accordance with the present invention;

FIG. 5 is a voltage versus phase characteristic of the capstan servo described herein;

FIG. 6 is a functional block diagram illustrating the portion of the capstan servo of the present invention which measures the phase, i.e., angular position of the capstan relative to its controlling reference;

FIG. 7 is a functional block diagram of the stop servo incorporated in the capstan servo of the present invention which correctly positions the tape relative to the nominal tracking position of the video reproduce head when stopping the tape from a non-color frame control track locked operating condition;

FIGS. 8A, 8B, 8C and 8D together comprise an electrical schematic diagram of a portion of the capstan servo circuitry to the present invention illustrating the phase comparator circuitry shown in the block diagram of FIG. 6;

FIGS. 9A, 9B, 9C and 9D together comprise an electrical schematic diagram of the remainder of the capstan servo circuitry, illustrating the sample and hold circuitry and the stop servo circuitry shown in the block diagram of FIG. 7, as well as the circuitry which performs the color framing function;

FIG. 10 is a functional block diagram of an automatic head position tracking system which operates to maintain a movable rotary head registered on tracks of recorded information as information is reproduced from the tape transported at different velocities; and FIG. 11 is a logic diagram of the synthetic control track signal generator operatively associated with the capstan servo of the present invention.

DETAILED DESCRIPTION

Broadly stated, the present invention is directed to a method and apparatus for controlling a tape longitudinally transported along a path relative to a rotating head as information is reproduced from the tape during changes in the velocity of the tape transport that permits the recorded information to be reproduced without objectionable loss and with minimum time disturbance. In the preferred embodiment described hereinbelow with reference to the drawings, virtually an immediate synchronous operating condition is obtained between the rotating record and/or reproduced head and the longitudinally transported tape upon initiation of the tape transport velocity change so that such synchronous operating condition is achieved before the tape transport velocity change to a normal record and/or reproduce transport velocity is completed. In the preferred embodiment, a rotary head video tape record and/or reproduce apparatus is color frame control track servo locked immediately upon commanding the apparatus to enter the normal play reproduce tape velocity operating condition from a tape transport stop condition or from a tape transport velocity other than the normal record and reproduce velocity.

In its most preferred embodiment, the apparatus is part of a helical wrap video tape recording and reproducing apparatus of the type which has a video reproducing head mounted at the end of a movable element which is capable of moving the head transversely relative to the longitudinal direction of a track along the tape. A head position tracking servo controls the movable element to cause the head to follow a track as information is reproduced therefrom and selectively repositions the head to begin following the next desired track from which information is to be reproduced. With a head position tracking servo, the apparatus is capable of the noise-free reproduction of recorded information at various velocities of tape transport. In such apparatus arranged to record and reproduce video (i.e., television signal) information, the movable head enables various special effects to be reproduced from the recorded video information, such as still field or frame motion, variable slow motion, fast motion and reverse motion. This capability is described in several patents and applications, including the U.S. Pat. No. 4,163,993 to Ravizza, and is incorporated in various video production recorders marketed by Ampex Corporation, such as the models VPR-1 and VPR-2. In the video production recorders marketed by Ampex, a single video head is provided to reproduce video information recorded on the tape and is controlled in the manner described in the aforementioned Ravizza patent to reproduce the information while the tape is transported at various velocities and in opposite directions to generate special motion effects. As is described in the aforementioned Ravizza patent, the movable element is controllable to cause the video head to reliably follow a track during the reproduction of video information therefrom and to correctly position the head to begin following the next desired track from which video information is to be reproduced.

When the apparatus is operated to reproduce still field effects, the transport of tape is stopped, i.e., at a speed of zero, and the movable video head must be reset at the end of the scan of each track to begin following the same track, hence, repeat the reproduction of the same field of video information. Such resetting is effected for as long as the apparatus is operated to reproduce the still field motion effect. During such operation, the voltage applied to the movable element for producing the desired displacement or movement of the element and supported video head is in the form of a sawtooth wave form, whose level is examined against a reset determining reference during the revolution of the video head to determine if the movable element is to be reset or permitted to remain in position at the end of the scan of each track by the movable video head, all as is fully discussed in the aforementioned Ravizza patent. When the head position tracking servo is operating together with the apparatus of the present invention, switching from the still motion effect operation when the transport of the tape is stopped to the normal reproduction of the video information when the tape is transported at the normal reproduce velocity permits proper color framing to be accomplished when the tape transport is stopped. Moreover, the color frame condition is maintained during the following rapid acceleration of the transport of the tape to the normal reproduce velocity with the servo controlled movable head reproducing each recorded track once without objectionable signal degradation. It is important to appreciate that color frame control track servo lock is retained and a video information signal is reproduced without objectionable signal degradation through the tape acceleration interval with no resetting and repeat reproduction of a track occurring. The acceleration of the tape transport is sufficiently fast that color framing is retained and the video information is reproduced from each track scanned by the video head without any head deviation from the track that would introduce disturbances in the display of the reproduced video information.

The velocity change can be executed in accordance with the present invention without objectionable loss of information and with minimum timing disturbance introduced into the reproduced information during an operating condition when the velocity of tape transport is changed between two velocities not starting with a zero transport velocity and not ending at a normal reproduce velocity. This enables the operation of video recording and reproducing apparatus provided with servo controlled movable heads to be changed between reproductions of different special motion effects without entering the still field motion effect reproduction operating mode during such change. As will be described in further detail hereinafter, the velocity change operation is executed in the same manner from all special effects tape transport speeds. However, it may be preferable to first change the transport of the tape to zero tape transport velocity and then incrementally move the tape after the transport of the tape is stopped to position an identifiable control track transition precisely relative to the nominal plane of rotation of the undeflected video head position when the operation is executed from a special effects tape transport velocity other than zero velocity or stop. This facilitates the execution of the subsequent acceleration of the tape to the desired final tape transport velocity without objectionable loss of reproduced information or introduction of disturbances in the display of the reproduced information. In accordance with the present invention, a signal, such as the control track signal, timing information included in the reproduced information, e.g., vertical sync or the equivalent included in a television signal, capstan tach, or the like, from which the velocity of tape transport can be determined must be provided in a manner so as to enable monitoring the velocity of transport of the tape during a velocity change.

The present invention includes circuitry which selectively functions under special conditions determined by such factors as: the operating mode of the apparatus; whether a change in the mode of operation is commanded; whether the transport of the tape is accelerated from stop condition or a velocity other than the normal tape transport velocity; and whether the tape is previously stopped from a control track locked condition or a noncontrol track locked condition. These conditions determine the velocity of transport of the tape and, therefore, the nature of the control required to effect the desired velocity change operation to the selected final tape transport velocity without objectionable loss of reproduced information or introduction of disturbances in the display of the reproduced information. The selected final tape transport velocity is determined by a system timing signal provided to maintain the tape transport velocity at the selected velocity. The tape transport velocity control circuitry relies for its operation on its ability to control the execution of the desired velocity change so that the net displacement between nominal plane of rotation of the rotary head and the tape during the velocity change interval is proportional to the product of (i) the difference between the final selected velocity of tape transport and the velocity of tape transport from which the velocity change interval is executed and (ii) the time taken to execute the velocity change. When a velocity change is executed to a final selected tape transport velocity corresponding to the normal record and/or reproduce tape transport velocity, timing information indicative of the rate of reproduction of the information recorded on tape relative to a system time reference is employed to effect the control of the velocity change. A recorded control track signal and vertical sync contained in the reproduced information are examples of such signals available in rotary head video tape recording and reproducing apparatus. Information signals recorded on the tape that contain a timing component which is synchronously recorded with a control track information signal that contains identifiable separate intervals periodically recorded along the tape provides the ability to obtain accurate measures of the velocity at which the tape is transported and position of the transported tape with respect to the nominal plane of rotation of the rotary head in the longitudinal direction of tape transport.

In accordance with the present invention, the tape transport control circuitry is responsive to a received system reference timing signal and at least a received system timing signal of corresponding nature from which the velocity of tape transport and position of the transported tape with respect to the nominal plane of rotation of the rotary head in the longitudinal direction of tape transport can be determined. Each of these signals defines a plurality of separate and identifiable intervals of corresponding nature that periodically recur. To facilitate the desired control of the tape transport velocity change, it is advantageous to employ a timing component contained in the reproduced information signal and the control track signal recorded on the tape as the system timing signal with respect to which the execution of the velocity change is controlled. The occurrence of a selected time relationship between identical ones of the identifiable intervals in the received signals is detected by the tape transport control circuitry. The circuitry responsively generates a command signal issued to a tape transport servo associated with the tape transport drive mechanism to effect the selected velocity change in tape transport to cause the tape to be transported at a selected final velocity. The servo responds to the command signal to control the tape transport drive mechanism to cause execution of the tape transport velocity change at a rate for a velocity change interval that results in a displacement of the transported tape at the end of the velocity change interval proportional to the aforedescribed product of the velocity change and interval of velocity change, adjusted for any residual displacement in the direction of tape transport at the end of the velocity change interval of the rotating head that is operated to reproduce the information signal. This adjusted displacement is referred to herein as net displacement. The proportional relation between the net displacement and the aforementioned product is determined by the acceleration characteristic of the portion of the tape transport mechanism affecting the acceleration of the tape. This can be determined for the tape transport mechanism by observing the velocity profile followed by the transported tape in response to a step velocity change command.

To maintain a disturbance-free reproduction of the recorded signal during the velocity change interval, it is preferred to execute the velocity change so that the timing relationship between the received identifiable intervals of the reference timing signal and of the system timing signal is retained during the velocity change interval. The rate of change in tape transport velocity required to retain such desired timing relationship is determined by the difference between the reference timing signal frequency and the velocity of the transported tape (hence, the system timing signal frequency) at the time of the initiation of the velocity change.

As will become apparent from the following description of preferred embodiments of the present invention, it is preferable that the tape displacement be achieved without a change in the timing relationship between a recurring identifiable intervals of the reference timing signal and of the system timing signal to a corresponding timing relationship of periods of the periodically occurring timing signals different from those which resulted in the initiation of the velocity change. However, it may not be possible to accelerate the tape at a sufficient rate to achieve this, for example, when large and massive tape reels or delicate tape which is incapable of withstanding the stress associated with such acceleration are used. Accordingly, a difference count is maintained between the number of periods of the reference timing signal and the system timing signal occurring during the tape transport velocity change interval, which is representative of the displacement, so that, although the desired timing relationship resulting in the initiation of the tape transport velocity change is temporarily lost during the execution of the velocity change, it is recaptured at the conclusion of the execution of the velocity change. Thus, this necessarily results in retaining at the conclusion of the velocity change interval the transport servo lock condition established at the time of the initiation of the tape transport velocity change. Regardless of whether the desired timing relationship between the reference timing signal and system timing signal is retained or temporarily lost during the velocity change interval, the transport servo responds to a velocity change command signal generated upon the occurrence of a selected time relationship between identical ones of the identifiable intervals in the reference and system timing signals to control the tape transport drive mechanism to cause execution of the tape transport velocity change at a rate that results in the net displacement of zero of the longitudinal tape position relative to the nominal plane of rotation of the rotary head.

In a rotary head tape recording and reproducing apparatus in which the rotary head is not permitted to be displaced in a direction transverse to the longitudinal direction of the track of recorded information, the transport drive mechanism must drive the tape according to a velocity profile which includes an interval during which the tape is transported to a velocity different from the selected final velocity in order to achieve the desired net displacement condition. For example, if the tape is transported at a velocity less than the selected final velocity at the time of initiation of the velocity change, the tape must be transported to a velocity greater than the selected final velocity for an interval to produce a zero net displacement. Conversely, if the tape is being transported at greater velocity than the selected final velocity at the time of the initiation of the velocity change, the transport of the tape must be decelerated to a velocity less than the selected final velocity for an interval to produce a zero net displacement.

In rotary head tape recording and reproducing apparatus provided with a head that is displaceable in a direction transverse to the longitudinal direction of the track of recorded information to maintain track registration, the head can be displaced to aid in achieving the aforedescribed desired zero net displacement condition during a tape transport velocity change. The head is displaced in a direction to reduce the magnitude of any such displacement. Therefore, the tape transport velocity change may be executed according to a velocity profile that does not require a velocity of tape transport during the velocity change interval that is greater than the selected final velocity (when a velocity change is executed from a tape transport velocity less than the final velocity) or less than the selected velocity (when a velocity change is executed from a tape transport velocity greater than the final velocity). However, the rate of tape transport velocity change must be sufficient to enable the displacement head to be displaced a sufficient distance to compensate for the displacement that will result from such velocity change in the longitudinal tape position relative to the nominal plane of rotation of the displaced head in the direction of tape transport. The result of following such velocity profile, however, is a permanent displacement of the rotational plane of the head when the normal tape transport velocity is reached. This may be undesirable because a constant timing error is introduced in the information reproduced by the permanently displaced head.

When the transport of the tape is stopped from a noncontrol track locked velocity operating condition, such as may occur when the tape is transported by a video tape recording and reproducing apparatus during a shuttle, a jog or a variable velocity slow motion or fast motion operation, a stop servo system operates to stop the transport of the tape with an identifiable recorded control track transition positioned precisely relative to the nominal plane of rotation of the rotary video reproduce head, i.e., the plane of rotation of the head when undeflected in the direction transverse to the recorded tracks. This conditions the apparatus so that in response to the generation of a reproduce command being initiated by an operator for the purpose of having the video tape recording and reproducing apparatus operate in a desired reproducing mode, the recording and reproducing apparatus is caused to reproduce recorded video information and is servo locked virtually immediately, i.e., within a time following the receipt of a velocity change command that is less than an interval defined by just less than the number of video fields required to fully encode the television signal. For example, two fields are required to fully encode a monochrome television signal, four fields for a NTSC color television signal and eight for a PAL color television signal. The SECAM color television signal is defined by a twelve field sequence. For purpose of this invention, however, a four field sequence enables execution of the desired velocity change. Moreover, if the tape transport mechanism is commanded to transport the tape at the normal record and/or reproduce velocity following such stop operation, control track synchronization and color frame synchronization of the operation of the apparatus is acquired prior to initiating acceleration of the transport of the tape.

The apparatus of the present invention also functions to stop the transport of the tape relative to a selected recorded control track signal transition location without the aid of the stop servo system so that the acceleration of the transport of the tape can thereafter be initiated with the recording and reproducing apparatus servo locked virtually immediately. If the stop servo system is not utilized, the apparatus of the present invention is operated to stop the transport of the tape during a reproducing operation having the tape transported under transport servo locked conditions. This is achieved in a rotary head video tape recording and reproducing apparatus by initiating the deceleration of tape precisely in response to the occurrence of a vertical sync reference timing signal obtained from a conventional television signal sync generator operated under the timing control of a system reference timing signal. When the transport of the tape is subsequently started, it will be under conditions of immediate tape transport servo lock and color frame synchronization, as is desired prior to accelerating the tape to the normal record and/or reproduce velocity, for example.

Before describing the arrangement and method of operation of the preferred embodiment of the apparatus of the present invention in detail with reference to the drawings, the synthetic control track generator 200 (FIG. 11), the capstan servo 300 (FIG. 4) and automatic head position tracking servo 400 (FIG. 10) employed in the preferred embodiment will be described. Turning first to FIG. 11, a synthetic control track signal is generated for use in the present invention to provide information to the control track servo indicative of the position of the longitudinally transported tape relative to the nominal plane of rotation of the rotary head when the tape transport is stopped. Vertical sync is extracted from the reproduced video information by conventional circuitry (not shown) included in video tape recording and/or reproducing apparatus as the reproduce video head scans the tape, and is provided at an input 212 and coupled to the clock input of a flip-flop 216. A No. 1 field identification signal (of a four field sequence in a NTSC format color video information signal and of an eight field sequence in a PAL format color video information signal), also conventionally extracted from the reproduced video information signal, is provided to a delay one shot circuit 228. The delay circuit 228 provides an output signal at its Q output, which is coupled to the "set" input terminal of the flip-flop 216 to synchronize the same to the occurrence of the field No. 1 identification signal. The time constant of the one shot circuit 228 is set to properly locate the leading edge of the field No. 1 identification signal relative to the proximate control track transition of the synthetic control track signal into which the identification signal is inserted. When connected as shown, the flip-flop 216 is clocked by play back vertical sync and operates as a divide by two divider and provides a 30 Hertz (Hz) frame rate square wave signal at its output. The period of the square wave signal generated by the flip-flop 216 is therefore equal to that of a normal control track signal. However, the 60 Hz rate transitions of the square wave signal are coincident with the 60 Hz vertical sync signal, whereas the transitions of conventional control track signals are offset relative to vertical sync.

The square wave signal is employed to form a synthetic control track signal and, for uses of the synthetic control track signal irrelevant to the present invention, is combined with a short pulse to provide field identification information therein. The field identification pulse is addded to the synthetic control track square wave signal synthesized by the flip-flop 216. The synthetic control track generator 200 shown in FIG. 11 provides a narrow pulse after the field No. 1 identification signal is received. It is delayed by the amount of the delay provided by the one shot 228. The delay circuit 228 times out and its Q-not output is coupled to trigger a monostable multivibrator, or one-shot 230. The one-shot 230 responsively produces a narrow pulse at the proper time for adding to the square wave signal as the desired field identification signal and has a controlling time constant that is set to effect the generation of a field No. 1 identification signal of common duration for insertion in the synthetic control track signal. For a NTSC format color video information signal system the field No. 1 identification signal is inserted in the synthesized square wave signal to occur every two periods of the signal, since the identification signal is at a rate of 15 Hz (or ½ the frequency of the 30 Hz square wave signal). For a PAL system, the field No. 1 identification signal is at a rate of ¼ the frequency of the synthesized square wave signal, hence, is inserted to occur every four periods of the synthesized signal. The output of the one-shot 230 is combined with the square wave generated by the flip-flop 216 in an NAND gate 218, and a synthetic control track signal having field identification signal information is produced at an output 232.

As previously mentioned, the timing of the synthetic control track is different from that of the conventional control track signal, which signal requires some modification for use in the operation of the control track servo. When the tape is driven at the normal record and/or reproduce velocity under servo control relative to the conventional control track and capstan tachometer signals, the control track signal transitions occur between vertical sync pulses. With reference to FIG. 4, the capstan servo 300 includes a control track error detector 343 that generates a control track related error signal in the form of a tape speed related voltage level that controls a following control track voltage controlled oscillator (VCO) 345, which provides an output signal at a frequency that determines the speed of a capstan motor of the tape transport drive mechanism. This output signal is coupled to one input of a capstan tachometer error detector 347 and serves as a reference signal for comparison to the capstan tachometer signal provided over input line 346. This error detector 347 provides a capstan servo error signal that is coupled to the capstan motor drive amplifier circuit 349 that responsively controls the drive provided to the capstan motor (not shown) to maintain the transport of the tape at the desired speed.

The control track related error signal is generated by sampling a ramp output of a linear ramp generator, with the sample being taken and held at a particular time, such as at the time of a control track transition. The ramp is reset by a delayed reference vertical sync signal. Samples are taken at the occurrences of control track transitions, which nominally occur at the midpoints of the occurrences of the voltage ramp signals when the tape is transported at the correct normal record and/or reproduce velocity. Variations in the occurrences of the control track transitions relative to the generation of the ramp signal result in the ramp signal being sampled at points along the slope of the ramp signal which are either higher (tape speed too slow) or lower (tape speed too fast) than the midpoint of the ramp signal.

If a synthetic control track signal is generated from vertical sync pulses extracted from the video information signal reproduced by the rotating video playback head, the slope of the ramp must be increased because the head rotates, hence, scans along the tape much faster than the longitudinal speed of the tape past the control track playback head. In an interval corresponding to about the duration of 2½ horizontal lines, or about 0.01 of the duration of a video field, the video head passes a longitudinal length of tape which corresponds to the distance the tape moves relative to the conventional stationary control track playback head during the reproduction of one video field. Thus, to compensate for the loss in sensitivity produced by the 100 times increase in the head to tape speed of the video head relative to the head to tape speed of the control track playback head, the slope of the ramp must be increased by the same factor to obtain the same resulting sensitivity.

The slope of the ramp is sharply increased by switching a switch located within the error detector 343, which effectively removes a large capacitor from the ramp generating circuit included in the control track error detector. The ramp is reset in response to the aforementioned delayed reference vertical sync. The delayed reference vertical sync is generated with an amount of delay which is changed depending upon whether regular or synthetic control track signals are used in the control track error detector 343. The delayed vertical sync is normally delayed by an interval corresponding approximately to the time of a full video field and in the synthetic control track mode, it is delayed by a slightly lesser amount to form an advanced reference vertical signal. The ramp is therefore reset slightly earlier by the advanced reference vertical signal than would otherwise occur.

An important consideration is that the timing of the sampling of the ramp signal in the control track error detector 343 is controlled so that the desired nominal zero tape speed error voltage level is identical whether the machine is using actual or synthetic control track signals.

Selection of the input signals to the capstan servo 300 and slope of the ramp signal used in the error detector 343 is determined by the position of the switches 353 and 351, and the signal status on the synthetic control track command input line 341. Either the normal control track signal or the synthetic control track signal is selected for coupling to an input terminal 338 by an operator controlled switch 351 shown in FIG. 4. Similarly, the normally delayed or advanced reference vertical signal is selected for coupling to an input terminal 340 by another operator controlled switch 353 shown in FIG. 4, the switches 351 and 353 being conjointly operated. When the operator initiates operation of the recording and reproducing apparatus to execute a tape transport stop from a non-control track lock operating condition, the synthetic control track command is provided on line 341. As described hereinbefore, this command is coupled to switches 351 and 353 to cause them to be positioned to couple the synthetic control track signal and the advanced reference vertical sync signal to the control track error detector 43. The command also is coupled to an input of the control track error detector 343 to cause the slope of the ramp sample signal generated in the error detector to be increased during the operation of the servo 300 in positioning the tape with an identifiable control track transition positioned precisely relative to the nominal plane of rotation of the rotary video reproduce head, as described hereinbefore and is described in further detail hereinafter.

Thus far, the capstan servo 300 has been described as arranged to operate when the transport of the tape is stopped under a control track locked condition. As will be described further hereinafter, the capstan servo 300 also includes a stop servo voltage controlled oscillator (VCO) 320 that is switched in the capstan servo 300 in place of the control track VCO 345 when the recording and reproducing apparatus is operated to stop the transport of the tape during a noncontrol track servo lock operating condition. During such operating conditions, a synthetic control track command is provided on line 341. The aforementioned switching occurs in response to tape stop command being received over input line 352 while a synthetic control track signal command is also present on input line 341. The tape stop command, typically, generated in response to the detection of a capstan stop condition, is provided after the execution of an operator initiated tape transport stop command that is coupled to disable the drive of the capstan. An AND gate 323 responds to these commands on lines 341 and 352 by activating switches 333 and 335 to couple the stop servo VCO 320 between the control track error detector 343 and the capstan tach error detector 347 in place of the control track VCO 345. In addition, a switch 381 is responsive to the AND gate 323 to disconnect the reverse/forward tape transport direction input line 348 from the capstan tach error detector 347. This input line carries a signal that signifies the direction in which the tape is to be transported in response to an operator manipulated tape direction control mechanism. In place of that signal, the stop servo VCO circuit 320 provides a tape transport direction signal to the input line 383 of the capstan tach error detector 347 via line 92 and switch 381. However, the capstan tach signal received on input line 346 is still provided to the capstan tach error detector 347 for use in controlling the transport of the tape to effect the positioning of tape relative to nominal plane of rotation of the rotary video head.

In accordance with an important aspect of the present invention, when the transport of the tape is stopped and the video tape record and reproduce apparatus is operated to reproduce the still field motion special effect from the recorded material and a normal tape velocity play command is caused to be generated by an operator to effect reproduction of the recorded material at the normal tape reproduce velocity, the apparatus of the invention advantageously makes use of a signal that identifies which field of the multi-field sequence of the television signal is being reproduced at the time such command is generated. As previously explained, a single field is repetitively reproduced when the record and reproduce apparatus is operated in the still field mode. During this operation, the servo apparatus of the present invention compares the aforementioned field identification signal with the station reference field identification signal. When a field match occurs, i.e., the repeating multi-field sequence signal forming the station field sequence reference identifies the onset of a reference field interval that corresponds to the particular field being repetitively reproduced, a field match signal is generated that enables the play command to be applied to the capstan servo. The capstan servo immediately accelerates the capstan to rapidly accelerate the transport of the tape to the normal tape reproduce velocity. It should be understood that if the video tape record and reproduce apparatus is arranged to reproduce a NTSC format color video information signal, then the multi-field sequence of the television signal will be a four field sequence. The circuitry which performs the identification of a particular field within a four field NTSC format sequence is conventional and commonly found in video tape record and reproduce apparatus, and in and of itself does not form a part of the present invention, except insofar as the field indentification information is utilized by the apparatus of the present invention. Generally, however, the playback sync processing circuitry typically included in such apparatus identifies whether field one (odd field) or field two (even field) of a particular television frame is being reproduced from the phase relationship of horizontal sync to vertical sync. A color framing circuit identifies whether the field being reproduced is associated with an odd or even color frame by monitoring the phase relationship of horizontal sync to color subcarrier. The particular field of a four field sequence is thereby derivable from relationships of information included in the video information reproduced from the tape so that during reproduce operations at any tape transport velocity, a two bit binary signal (the state of one bit indicative of field and the state of the other bit indicative color frame) is capable of providing the identification of which field of the four field NTSC sequence is being reproduced at any given moment. Similarly, for an eight field sequence PAL format television signal, a three bit binary signal identifies which field of the eight field sequence is being reproduced at any given time.

Figure 1:
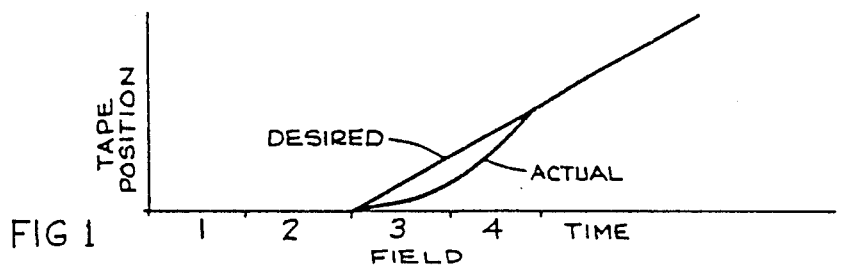
FIG. 1 is a graph illustrating the desired and actual profiles of tape position versus time, specified in television field intervals, during the acceleration of the transport of the tape from stop to normal velocity, with the tape position taken relative to the nominal position of the plane of rotation of a rotating video head that scans the tape to reproduce video information therefrom.
Figure 2:
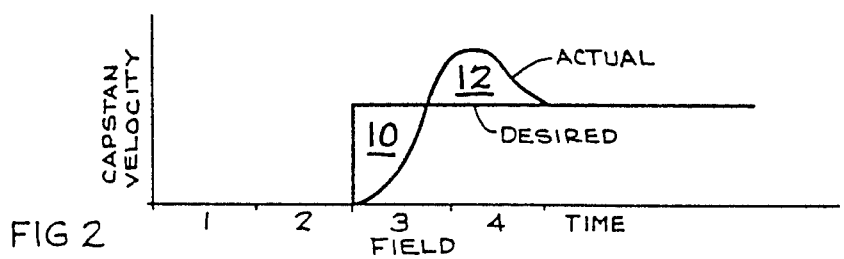
FIG. 2 is a graph illustrating desired and actual capstan velocity profiles versus time during acceleration of the transport of the tape from stop to normal velocity.

The manner in which the tape transport velocity control apparatus of the present invention operates when it is switched from a still field reproduce mode to normal tape speed reproduce mode can be more readily appreciated from the following discussion in conjunction with FIGS. 1 through 3. In each of the figures, the abscissa of each graph corresponds to time, and the apparatus effects the transition from the still field reproduce mode to the normal tape velocity reproduce mode in the time, or tape velocity change interval, required to reproduce no more than five fields of video information. In a NTSC system, it may require an interval corresponding to three television fields to obtain the field match condition required before the tape acceleration is initiated. As illustrated in FIGS. 1-3, once the desired field match condition occurs, the acceleration of the tape to the normal tape velocity is accomplished in an interval corresponding to two television fields. Thus, in FIGS. 1 through 3, the video tape record and reproduce apparatus is operated in the still field reproduce mode during the occurrence of field intervals one and two of the station field sequence reference identification signal, with field interval three being the reference field interval which is matched to the field repetitively reproduced by the record and reproduce apparatus. When this match occurs, the capstan servo 300 (FIG. 4) receives a command that activates it to accelerate the transport of the tape and effect a tape velocity change from zero to the normal tape reproduce velocity. In FIG. 1, the tape position is shown versus time, and at the start of field three reference interval, the transport of the tape is initiated and the actual tape position movement is shown to follow a curved line. The desired tape position movement, which would be required to maintain an in-phase condition between the station field sequence reference signal and the reproduced video signal during the velocity change interval, is shown as a straight line, indicating infinite acceleration which, of course, is actually impossible to obtain. The curved line of actual tape position movement indicates that the tape position relative to the nominal plane of rotation of the rotary video reproduce head lags the desired tape position during the execution of the tape velocity change interval. However, as should be apparent from the foregoing description of the present invention and will become more apparent from the more detailed description of the preferred embodiment of the invention, the transport of tape is controlled to execute the tape velocity change so that tape transport servo lock is obtained before the velocity change is executed and is maintained throughout the execution of velocity change, as would be the case if the tape transport mechanism was capable of achieving infinite acceleration. Moreover, FIGS. 1-3 indicate this velocity change is executed so that the net tape position displacement at the conclusion of the execution of the velocity change is zero with the rotary video reproduce head undeflected from its nominal transverse position relative to the recorded track of video information in the nominal plane of rotation of the head.

The graph of FIG. 2 illustrates the capstan velocity change profile wherein it is desired to instantaneously obtain the actual normal reproduce tape velocity for the normal reproduce mode of operation. For the desired tape position movement, the capstan velocity is shown to change instantaneously at the beginning of field three interval of the field sequence reference identification signal. For the actual tape position movement, however, the actual velocity change profile reflects an acceleration that is less than that required to achieve the desired instantaneous velocity change. To obtain the desired normal reproduce tape velocity in a manner whereby color frame synchronization is retained, it is necessary to overshoot the normal tape reproduce velocity to compensate for the aforementioned tape position lag in a manner that results in a zero net tape position displacement with the rotary video reproduce head undeflected from its nominal plane of rotation at the conclusion of the execution of the velocity change. In overshooting the normal tape reproduce velocity, the tape is first accelerated to a velocity greater than the normal velocity and then decelerated to the normal velocity. This acceleration and deceleration of the transport of the tape is performed so that the area designated by the reference numeral 10 is equal to the area designated by the reference numeral 12, which maintains the phase coincidence between fields reproduced from the transported tape and those of the field sequence reference signal that existed when the acceleration of the tape was initially started, i.e., at the start of field three reference interval. As shown in FIG. 1, the actual tape position initially will lag the desired position during the field three reference interval as the tape is accelerated and, thereafter, it will gradually be made to coincide with the desired tape position as a result of the tape velocity exceeding the normal reproduce tape velocity during a part of the velocity change interval.

The preferred embodiment of the present invention includes an automatic head position tracking servo as previously mentioned, which is effective to maintain the head registered with respect to each track as it is being reproduced and to selectively reposition the head to begin following the next desired track to be reproduced. As shown in FIG. 3, during the still field reproduction mode of operation of the record and reproduce apparatus, such as occurs during the repetitive reproduction of a single track of recorded video information during the reference field intervals one and two as illustrated, the head must be reset after the completion of the first field reference interval to begin reproducing the same track of recorded video information again. At the instant the command to accelerate the transport of the tape is received, an AST normal signal is issued over line 393 of the automatic head position tracking servo 400 (FIG. 10). The occurrence of this acceleration command is signified by a sync start command provided to an OR gate 391 of the capstan servo 300 (FIG. 4) over input line 392 when the aforedescribed field match condition occurs and the transport of the tape is less than one-half the normal record and/or reproduce velocity, in either the forward or reverse tape transport directions. It will be appreciated that the AST normal signal is also issued by the OR gate 391 in response to a control track lock condition being achieved. The OR gate 391 receives a signal over its input line 394 from the control track error detector 343 when this condition is achieved, for example, when the transport of the tape is changed from a velocity in excess of aforementioned one-half normal tape transport velocity to the normal record and/or reproduce tape transport velocity and control track lock is achieved. The AST normal signal is coupled to the input of the automatic head position tracking servo 400 (FIG. 10), which responds to inhibit the generation of head position reset commands (except at the limits of the deflection range of the movable element 401 carrying the reproduce head 402) while the tape transport velocity change to the normal record/reproduce velocity is executed. This allows the head to follow the consecutively recorded tracks without being reset, even though the tape is transported at velocities other than the normal record and reproduce velocity during the 2-field interval velocity change. Track following by the movable reproduce head results from the detection of amplitude modulation of the reproduced radio frequency (RF) envelope formed by a carrier that is frequency modulated by the television signal information, which amplitude modulation is caused by the dithering of the movable element 400 as described in the aforementioned U.S. Pat. to Ravizza, No. 4,163,993. This reproduced signal is coupled from the reproduce head 402 to the automatic head position tracking servo 400 by input line 403.

The automatic head position tracking servo 400 controls the movable element 401 to displace the reproduce head 402 transversely of the track of video information being reproduced so as to maintain the head on the track being reproduced during the third reference field interval and, as the tape is accelerated by the capstan to normal reproduce tape velocity, movable element 401 will not be reset (because of receipt by the servo 400 of the aforementioned reset inhibiting AST normal signal over line 393). Thus, the reproduce head 402 is permitted to follow the next track, i.e., the track from which field four of the video information is reproduced. At the conclusion of the velocity change interval when the tape is controlled by the capstan servo 300 (FIG. 4) to maintain it at the normal tape reproduce velocity, the video reproduce head 402 need not be moved appreciably by the servo controlled movable element 401 to maintain the head registered with the track from which the video information is being reproduced. This is depicted in FIG. 3 by the straight line subsequently of the field four interval. Since the capstan accelerates the tape very rapidly, the automatic head position tracking servo 400 will maintain the head on track without exceeding its dynamic range of operation. Consequently, the video tape reproducing apparatus operates during the velocity change interval to reproduce a continuous video signal without break-up or like disturbances in the video information when displayed on a television monitor.

With reference to FIGS. 4 and 6, after a field match has occurred and the play command is applied to the capstan servo 300, phase comparator circuitry 13 (FIG. 6) included in the capstan error detector 347 (FIG. 4) performs a phase comparison of the actual capstan rotational phase with a capstan tach reference provided by the control track VCO 345 (FIG. 4), as described hereinbefore. In response to this comparison, the phase comparator circuitry 13 generates an error signal that is applied to the capstan motor drive amplifier 349 (FIG. 4), which returns the capstan to the exact phase of the reference after the tape velocity change has been completed. In this manner, the capstan servo 300 maintains the field sequence phase relationship between the capstan driven tape and the field sequence reference identification signal resulting in the aforementioned field match condition. For example, under operating conditions depicted in FIGS. 1-3, the phase relationship occurring at the start of field three of the field sequence reference identification signal is maintained, and the phase of the capstan is controlled to coincide with the phase of the reference at the end of the acceleration, i.e., at the conclusion of the reproduction of field four of the video information. It should be understood that when the video reproduce apparatus is operated to reproduce video information from the tape while the tape is transported at the normal reproduce tape velocity, the tape transport mechanism is in a capstan servo locked condition. If transport of the tape is stopped from the normal reproduce tape velocity, the phase comparator circuitry 13 also is effective to stop the tape with a control track transition recorded along the tape precisely located at a predetermined position relative to the nominal plane of rotation of the rotary video reproduce head. Thus, when the reproduce apparatus is operated in a still field reproduce mode, the tape will be positioned at a determinable location relative to control track transition locations so that when the command to accelerate the transport of the tape is generated in response to the occurrence of the aforedescribed field match condition, the phase comparator circuitry 13 operates to maintain the transport of the tape in a control track servo locked condition during the tape velocity change interval, as is desired.

The phase comparator circuitry 13 is shown in the block diagram of FIG. 6 to include an 8-bit capstan up/down counter 14 that is clocked by the capstan tachometer pulses received via line 16 and an 8-bit reference up/down counter 18 that is clocked by a reference tach clock signal received via line 20. The counter 14 provides a binary output signal representative of the number of capstan tachometer pulses counted that is applied to one input of a summing circuit 22 via lines 24. The count of the reference tach clock signal contained in the counter 18 is represented by a second binary output signal that is applied to a second input of the summing circuit 22 via lines 26. The summing circuit measures the difference between the counts of the counters and provides a digital count difference signal on lines 28, which extends to the input of a digital-to-analog converter 30. The converter 30 generates an analog error signal on line 32 corresponding to the digital difference count applied to the input of the converter over lines 28. Inasmuch as the difference count on lines 28 represents the difference in the number of clock cycles counted by the two counters 14 and 18, hence, phase difference between the capstan tach signal on line 16 and the reference signal on line 20, the difference count and corresponding analog signal on line 32 represents the capstan phase error. This phase error analog signal is coupled by line 32 to the motor drive amplifier 349 (FIG. 4) to drive the capstan in a manner that eliminates the error.

The phase comparator circuitry 13 is also provided with means that enables the circuitry to effect such tape transport control regardless of the direction the tape is transported. More specifically, when the capstan is driven to transport the tape in the forward direction, line 34 is set by an operator initiated tape transport direction indicative signal received via line 383 (FIG. 4) that conditions the up/down counter 14 so that it is incremented. The signal on line 34 also controls a switch 36, which is connected to a line 38 that couples a signal to enable the counter 14 to operate. Reference counter 18 also has an up/down control line 40 which is set by the operator initiated tape transport direction indicative signal to cause the counter to decrement when the capstan is driven to transport the tape in forward direction. This signal also controls a switch 42 that has line 44 connected to couple a signal to enable the counter 18. The summing circuit 22 provides a nominal output count that is preferably at one-half of its range, i.e., count 127, which is applied to the digital-to-analog converter 30. The converter responsively provides a zero voltage output indicating zero error when the sum of the digital count values represented by the binary signals on lines 24 and 26 from counters 14 and 18 is a count of 127.

When the capstan servo 300 (FIG. 4) is provided with a signal to begin acceleration of the transport of the tape from stop in the forward direction tape, the control track VCO 345 (FIG. 4) provides a reference clock signal at a stable rate corresponding to desired normal reproduce tape speed, as is common in capstan servos, that clocks the counter 18 to cause it to count downwardly. In addition, the capstan tachometer signal on line 16 clocks the counter 14 to cause it to begin counting upwardly. By virtue of the fact that the acceleration of the tape starts from a tape stop condition, the counter 18 is decremented by the reference clock signal at a rate that is initially faster than the rate of the capstan tach signal that clocks the counter 14. Thus, counter 18 decrements faster than the counter 14 increments and the summing circuit 22 will have a net count less than 127, which is applied to the digital-to-analog converter 30. The converter 30 responsively outputs a corresponding negative analog signal over line 32 extending to the motor drive amplifier 349 (FIG. 4) that drives the capstan to accelerate the transport of the tape. When the velocity of the tape first reaches the normal tape reproduce speed, the counter 18 will have received and counted more reference clocks than the number of capstan tach clocks received and counted by the counter 14. This occurs because the transport of the tape cannot be accelerated at an infinite rate as would be required for the counter 14 to receive a number of capstan tach clocks corresponding to the number of reference clocks received by the counter 18. As explained hereinbefore with reference to FIGS. 1–3, at this time the actual tape position relative to the nominal plane of rotation of the rotary video reproduce head lags, or is disposed from that which is desired. The amount of this lag or displacement corresponds to the difference in the counts of the two counters 14 and 18, and the summing circuit 22 and converter 30 respond to cause the generation of a corresponding analog error signal, on line 32. This results in the continued acceleration of the capstan, hence, transport of the tape.

As the capstan is driven to accelerate the transport of the tape to a velocity that exceeds the normal reproduce tape velocity, i.e., the overshoot area shown in FIG. 2 by the reference numeral 12, the capstan tachometer signal clocks the counter 14 more rapidly than the reference clock signal on line 20 clocks the counter 18 and, eventually, the count of counter 14 will exceed that of counter 18. When this condition obtains, the net difference count provided by the summing circuit 22 will exceed 127, which is applied to and converted by the digital-to-analog converter 30 to a corresponding correcting analog error signal on line 32. This error signal is coupled to the motor drive amplifier 349, which responds by decelerating the capstan, hence, transport of the tape until the desired normal reproduce tape velocity is achieved. When this occurs, the summing circuit 22 provides a nominal difference count output of 127 on lines 28, which causes a zero error output voltage to be produced on line 32 by the digital-to-analog converter 30. In this manner, the phase comparator circuitry 13 causes the tape transport velocity to follow the profile labelled in FIG. 2 as actual without the loss of control track servo lock.

Line 32 is also applied to a first input of a comparator 46, as well as to a first input of a second comparator 48, with the comparator 46 having a positive reference voltage applied to a second input, and similarly, comparator 48 having a negative reference voltage applied to a second input. If the counting range limit of the summing circuit 22 is reached, either above or below its mid-range count of 127, then it is preferred that the counter which is causing the range limit to be reached be disabled, since a phase reversal would occur if the summing circuit was allowed to exceed its range. If the level of the analog error signal on line 32 exceeds the positive reference voltage in the positive voltage direction, the normally low output line 50 of comparator 46 goes high, which disables the counter 18. Similarly, if the value on line 32 exceeds the negative reference voltage in the negative direction as determined by comparator 48, the normally low output 52 of comparator 48 goes high and disables the counter 14. If the capstan is driven to transport the tape in the reverse direction, then switches 36 and 42 are switched to the opposite position than that illustrated in FIG. 6, and the comparators will be effective to switch the opposite counters, as is apparent.

The phase versus voltage characteristic of the capstan phase comparator circuitry 13 is shown in FIG. 5 and is generally linear throughout its effective range, which extends from the positive reference value to its negative reference voltage value. These values correspond to the reference voltage values that are applied to the second inputs of the comparators 46 and 48 previously described. When the phase comparator circuitry 13 is operating normally, the output will generally be an incremental voltage having a variable duty cycle that reflects the count difference output of the summing circuit 22. If the count difference of the summing circuit 22 corresponds to the nominal count of 127, an analog zero value is output over line 22 by the phase comparator circuitry 13, as shown in the graph of FIG. 5. If the count difference increases by a single count, a small voltage increase is generated by the digital-to-analog converter 30 on output line 32. This increased voltage is maintained until a response by the capstan driven by the circuitry 13 changes the tape transport velocity and relative counts contained in the counters to cause the summation circuit 22 difference count output to return to count 127.

In accordance with another important aspect of the present invention, the apparatus is particularly adapted to stop the transport of the tape with the control track transitions located in a preferred predetermined positional relationship relative to the nominal plane of rotation of the rotary video reproduce head while the video tape reproduce apparatus is operating in a noncontrol track locked condition. As briefly discussed hereinbefore, this occurs when the reproduce apparatus is in a shuttle mode, a variable tape velocity slow motion reproduce mode or in a jog mode. In such operating modes, the tape transport servo of typical video tape record and reproduce apparatus controls the drive provided to the capstan to maintain the transport of the tape at the desired velocity by phase comparing the capstan tach to an operator controllable velocity reference clock signal instead of to the control track related clock signal as was previously described with reference to FIG. 4. Moreover, in such record and reproduce apparatus provided with an automatic head position tracking servo, such as described hereinbefore with reference to FIG. 10, a displaceable video reproduce head is controlled to maintain the head registered with the tracks from which the video information is being reproduced during such operating modes. For example, when such record and reproduce apparatus is operated in a slow motion operating mode with the tape transported at a velocity less than the normal reproduce tape velocity, the displaceable video reproduce head is controlled to repeat the reproduction of tracks of recorded video information one or more times, depending on the velocity of transport of the tape. While this enables the reproduction of the recorded video information so that a disturbance-free display on a television monitor is obtained, the desired synchronous condition between the reproduced fields of video information and the field sequence reference identification signal characteristic of a control track servo lock condition is not maintained. Moreover, when such record and reproduce apparatus is operated to bring the transport of the tape to a stop condition from such an operating mode, the apparatus does so without capturing and maintaining such desired field sequence synchronous condition. Consequently, the transport of the tape is brought to stop by such apparatus without the control track transitions of the control track signal recorded on the tape located in a predictable, known relationship relative to the nominal plane of rotation of the displaceable video reproduce head. In addition, the transverse position of the displaceable video reproduce head relative to the nominal plane of rotation of the head is not predictable. When such record and reproduce apparatus is thereafter operated to reproduce the recorded video information, the transverse position of the displaceable head relative to the nominal plane of head rotation is controlled so that, at the beginning of each scan of the repetitively scanned track of video information, it is within a range of one-half the distance separating the centers of adjacent tracks of recorded video information. However, the exact position is not predictable or controllable.

In accordance with the preferred embodiment of the present invention, the position of the tape relative to the nominal plane of rotation of the deflectable video reproduce head is adjusted to a known relative position after the transport of the tape is stopped, whereby the aforedescribed acceleration of transport of tape under the desired control track locked servo condition can thereafter be executed. More specifically, when a tape transport stop command is provided to video tape reproduce apparatus while it is in a noncontrol track locked operating mode condition, a circuit operates to stop the tape with the control track transitions located in the aforementioned preferred relationship, so that in response to a normal tape velocity reproduce command, the transport of the tape is accelerated to the normal reproduce tape velocity in a control track servo locked condition in the manner previously described with respect to the block diagram of FIG. 6. The circuitry which accomplishes such stopping of the transport of the tape is illustrated in the block diagram of FIG. 7 and is conveniently referred to as the stop servo circuitry 320. As previously described, the control track error detector 343 includes a sample and hold circuit which operates in a generally conventional manner in that it includes a ramp generator which generates a ramp waveform that is reset by the reference vertical signal and is sampled at a predetermined time determined by control track transitions reproduced from the transported tape. An error signal is generated by detecting the level of the ramp at the sample time. The stop servo circuit 320 embodied in the preferred embodiments of the present invention utilizes the sample and hold output for the purpose of adjusting the position of the tape after its transport has been stopped so that the control track transitions are located in a known selected position relationship relative to the nominal plane of rotation of the rotary video reproduce head after termination of the operation of the stop servo circuit. However, as previously described with reference to FIGS. 4 and 11, no control track signal is reproduced or available when the transport of the tape is stopped. In this operating condition, the synthetic control track signal derived from the reproduced video information signal is employed by the control track error detector 343 in generating the error signal provided to control the stop servo circuitry or VCO 320 (FIGS. 4 and 7).

Thus, as shown in FIG. 7, the sample and hold output of the control track error detector 343 (FIG. 4) is applied on line 60 and through a resistor 62 to the input 64 of an integrator 66, which integrates a negative error positively and positive error negatively. The output of the integrator appears on line 68 which is coupled to the a first input of each of two comparators 70 and 72. The comparator 70 has a positive reference voltage applied at its second input and the comparator 72 has a negative reference voltage applied to its second input. The comparators function as separate oscillator circuits to provide pulses to the capstan tach error detector 347 (FIG. 4) together with a directional signal to cause the capstan servo 300 to move the tape one or more incremental distances so that it is properly positioned with a control track transition located relative to the nominal plane of rotation of the video reproduce head in the same manner as would occur if the transport of the tape was brought to a stop under a control track locked condition. Thus, comparator 70 has output line 74 that is caused to go high if the output of the integrator applied on line 68 exceeds the positive reference voltage coupled to the second input of the comparator. The line 74 extends to one end of a resistor 76, the other end of which is coupled to the line 64 that extends to the input of the integrator 66. When the line 74 is made active by the comparator 70, the feedback to the integrator 66 causes the integrator to reduce its output signal on line 68. When output signal has been reduced to a level below the reference voltage provided to the comparator 70, the comparator output is switched low and the integrator 66 is then subject to the level on the sample and hold line 60. If the sample and hold level remains low, the comparator 70 is again switched high to repeat the foregoing sequence to provide the same resulting signal on line 74. In this manner, line 74 is switched alternately, or oscillated, between high and low levels.

The output of the integrator 66 is also applied to the comparator 72, which has a negative reference voltage applied at its second input. The output line 78 of this comparator goes high, if the value of the integrated output exceeds the reference value in the negative direction, which occurs when the sample and hold level is high. If such occurs, the comparator 72 output appearing on line 78 goes high and, by virtue of inverter 80, a low signal is placed on line 82. This low signal is applied through resistor 84 to line 64 and, therefore, the input of the integrator 66. A high signal level from the sample and hold circuit on line 60 causes the negative going output provided by integrator 66 on line 68 to activate the comparator 72 to switch alternately between high and low levels as described with reference to comparator 70, to form an oscillating signal.

Lines 74 and 78 from the outputs of the comparators 70 and 72 also extend to the input of an OR gate 86, whose output is coupled to line 88. Therefore, the OR gate 86 couples to line 88 the oscillating output signal of the activated one of the comparators 70 and 72. Line 88 extends to the switch 335 (FIG. 4), which is in a position to couple the signal to the capstan error detector 347 by virtue of the aforedescribed operation of AND gate 323 when the video tape record and reproduce apparatus is commanded to stop the transport of the tape from a noncontrol track lock operating mode. This oscillating signal is coupled as the reference clock signal to the clock input line 20 of counter 18 of the capstan tach phase comparator circuitry 13 illustrated in FIG. 6.

The direction that the tape must be moved to achieve the desired tape position relationship relative to the nominal plane of rotation of the rotary video reproduce head is determined by examination of the outputs of the comparators 70 and 72. The direction of the mispositioning, or phase error of the tape is signified by the output signal provided by the sample and hold circuit of the control track error detector 343 (FIG. 4), because the sense of the output signal provided by such detectors relative to a zero error condition indicates the direction that the drive applied to the tape transport mechanism must be changed to cancel any detected error. This characteristic of the detector output is taken advantage of in the stop servo VCO 320. More specifically, a low level signal is provided on line 60 when the ramp of the sample and hold circuit included in the control track error detector 343 is sampled early relative to a zero error condition by the synthetic control track signal, which necessarily occurs when the tape is positioned in the forward direction from the desired position. Therefore, the output 74 of the comparator 70 is oscillating between the aforedescribed high and low signal levels if this tape position condition occurs when the transport of the tape is brought to a stop under a noncontrol track servo lock operating condition. Correspondingly, a high level signal is provided on line 60 when the ramp of the sample and hold circuit is sampled late relative to a zero error condition, which necessarily occurs when the tape is mispositioned in the reverse direction. Under these conditions, the output 78 of the other comparator 72 is oscillating between the aforedescribed low and high signal levels.

As will be appreciated from the foregoing, the oscillating outputs of the two comparators 70 and 72 are opposite in phase. By coupling these lines to the set and reset terminals of a flip-flop 90, the output level of the Q output of the flip-flop on line 92 signifies the direction of capstan movement that is required to position the tape as desired. This output line 92 is coupled via switch 381 and line 383 (FIG. 4) to the up/down line 40 of the reference counter 18 of the capstan phase comparator circuitry 13 (FIG. 6) to either increment or decrement the counter in accordance with the direction of movement that is desired of the capstan. The values of the reference voltages applied to the comparators 70 and 72 are determined to provide the appropriate degree of accuracy and by placing the comparator reference voltage values appropriately, there will not be any pulses produced on the line 88 if the tape is in the proper position, which is signified by a signal on line 60 indicative of a zero error tape position condition. Stated in other words, the stop servo circuitry 320 generates pulses together with direction signals that are based upon the timing between the reference vertical sync timing signal and the reproduced vertical timing component included in the reproduced video information signal in order to properly position the tape via the operation of the capstan phase comparator circuitry 13 (FIG. 6), i.e., position the tape so that the capstan tach error is zero.

The detailed circuitry which carries out the operation described with respect to the block diagrams of FIGS.

6 and 7 is shown together with the entire capstan servo circuitry in FIGS. 8 and 9. The entire capstan servo circuitry will not be described in detail herein, nor will the detailed operation of the portions of the circuitry that comprise the present invention, except insofar as it is necessary to provide an understanding of the operation of the present invention.

Figure 9B:
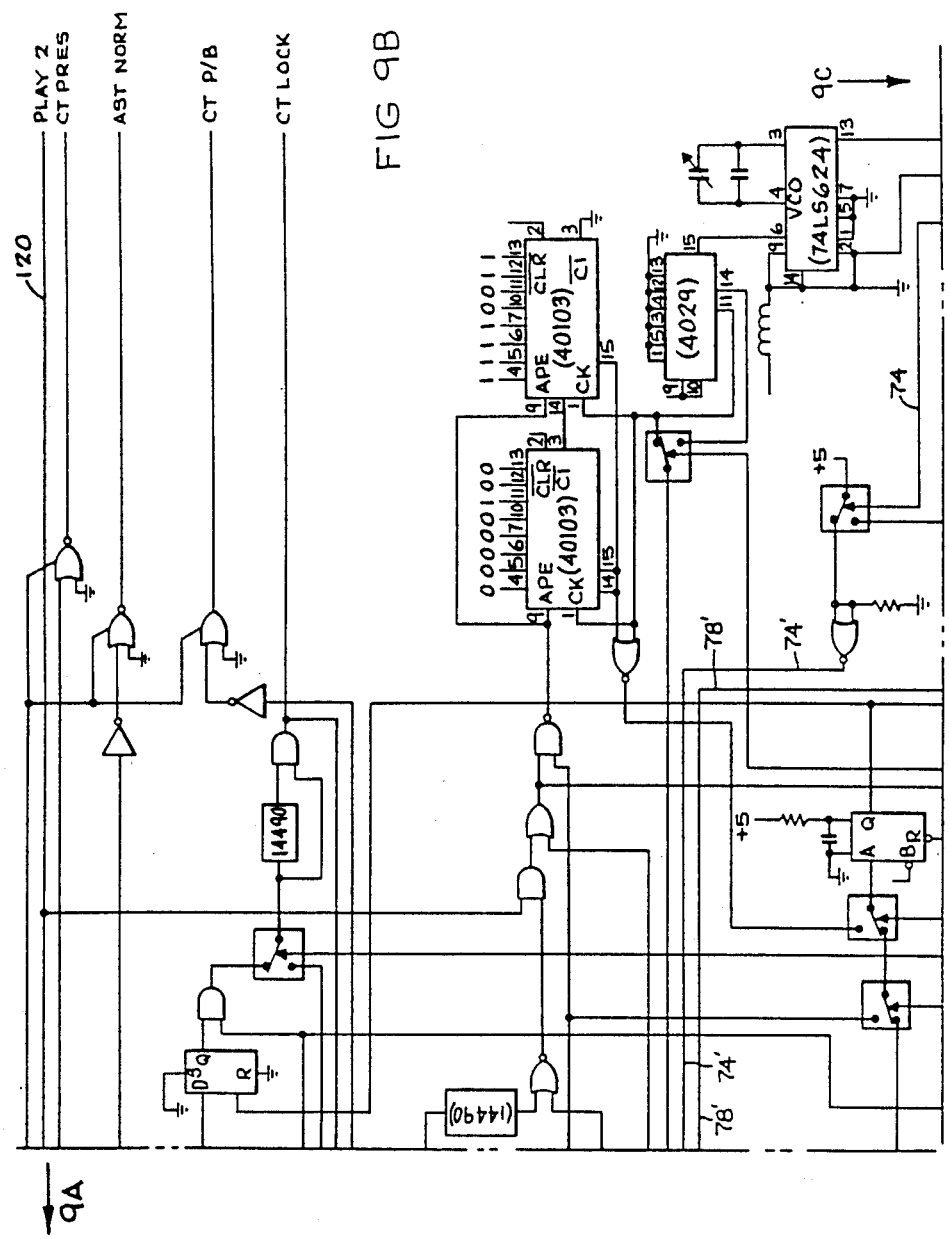
Figure 9D:
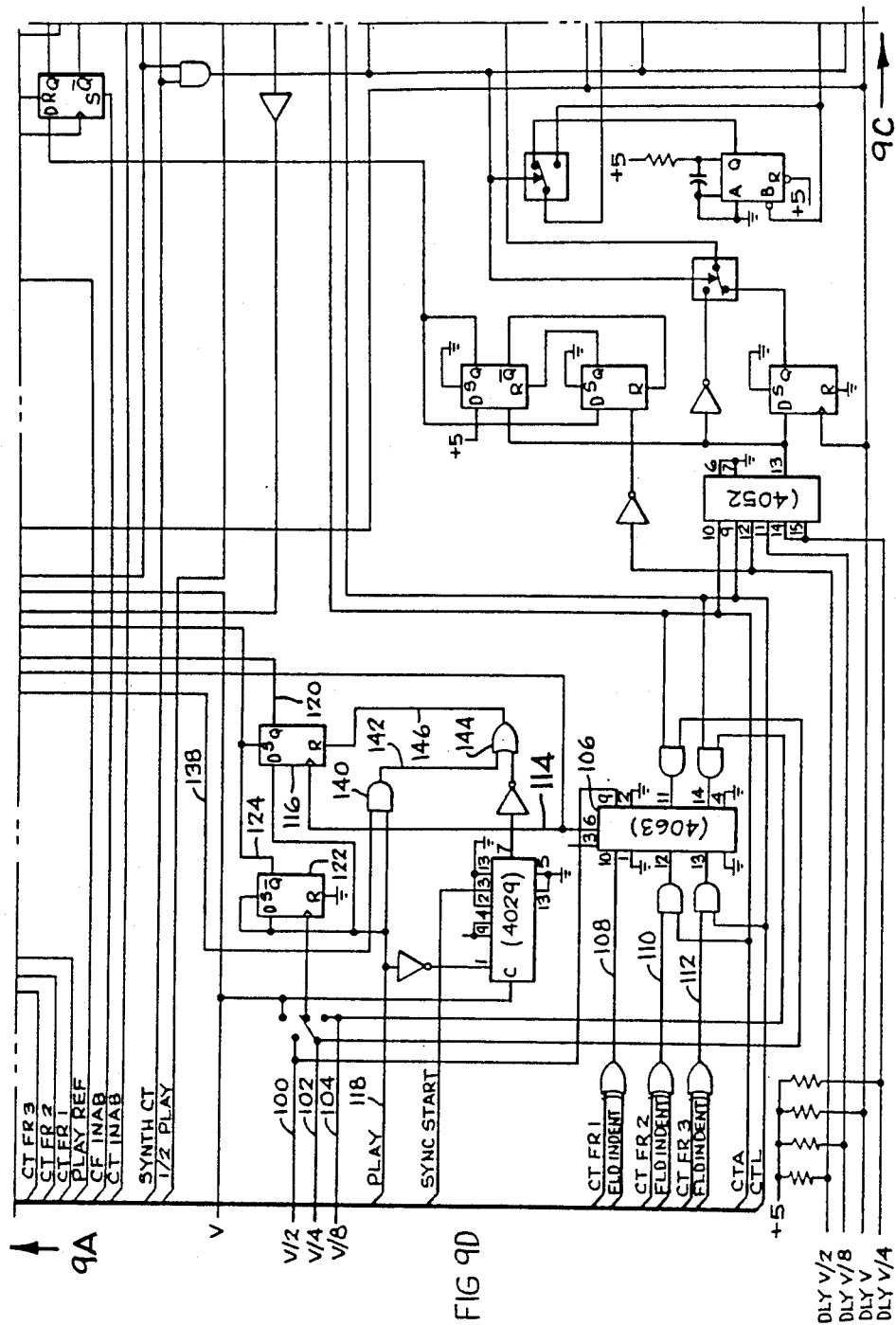

Turning initially to the circuitry which provides a signal indicative of the desired field match between the reference field identification signal and the field identification signal derived from the reproduced video information, reference is made to FIG. 9D. The field match detection circuitry receives on line 100 a multi-bit binary signal indicative of reference field, the bits indicative of the reference vertical sync divided by two, reference vertical sync divided by four on line 102, and reference vertical sync divided by eight on line 104, which lines are extended to inputs of a 4-bit comparator 106. A second multi-bit binary signal indicative of the field identification signals derived from the reproduced video information signal are also applied to the comparator 106 via lines 108, 110 and 112. The detailed circuitry shown in FIG. 9 is adapted for use with a video information signal of NTSC format as well as a PAL format signal. In the event the video tape record and reproduce apparatus is operated to reproduce a NTSC signal, then lines 104 and 112 are not be utilized, inasmuch as only a four field sequence exists with a NTSC format system. The lines 108 and 110 are binary signals which indicate the particular field of a four field sequence and are obtained from conventional circuitry that in and of itself is not part of the present invention. The signal state on line 108 defines whether the field being reproduced by the machine is an odd or even frame and the signal state on line 110 defines whether it is an odd or even field.

During the still field reproduce mode, the signal levels on lines 108 and 110 will be static, inasmuch as the same field of the recorded video information is repetitively reproduced. If the tape is transported so that successive tracks of fields of recorded video information are reproduced, the levels on lines 108 and 110 will change as different fields of recorded video information forming the four field NTSC television signal sequence are reproduced. With respect to the reference signals on lines 100 and 102, these reflect the field identification information from the station reference and identify a sequence of four distinct reference field intervals that recur at a stable rate.

Whenever the signal levels on lines 100 and 102 extending to the comparator 106 are identical to the signal levels on lines 108 and 110 for a NTSC television signal format system, there is a field match signal generated signified by output line 114 going high. This high state transition clocks a D flip-flop 116, which receives a normal reproduce tape velocity or play command in the form of a high level signal applied on line 118 from the control system of the record and reproduce apparatus. As a result of this clocking, the high level play command is clocked through the flip-flop 116 onto line 120 which activates the capstan servo 300 (FIG. 4) to begin accelerating the transport of the tape to the normal reproduce tape velocity. The play command is generated by other circuitry in response to an operator placing the record and reproduce apparatus into normal reproduce tape velocity mode. From the foregoing description of the field match circuitry, it should be appreciated that the play command is not applied to the capstan servo until a field match signal is produced by the comparator 106, which clocks the play command through the flip-flop 116 onto line 120, which is identified as a "play 2", for application to the capstan servo to enable it to drive the capstan motor drive amplifier 349 (FIGS. 4 and 8C). The above-described circuitry effectively delays the application of the play command to the servo, which activates the same to accelerate the transport of the tape, until a field match is obtained so that color framing is achieved before the transport of tape is initiated.

In accordance with another aspect of the present invention, when the record and reproduce apparatus is operating at normal reproduce tape velocity and subsequently receives a stop command, the phase comparator circuitry 13 of FIG. 6 stops the transport of the tape at the desired position with the control track transitions located in a known position relationship relative to the nominal plane of rotation of the rotary video reproduce head, as is desired. Since the tape is transported under a control track servo locked condition during this normal reproduce mode, the aforedescribed circuitry illustrated in FIG. 9(D) operates to activate the phase comparator circuit and stop the transport of the tape on field one of the four field NTSC sequency in the following manner. The V/4 signal on line 102 is coupled to the clock input of a flip-flop 122, the D input of which is supplied by the signal on line 118, i.e., the normal reproduce tape velocity or play command. When tape transport stop is commanded, the line 118 is switched from the high play command level to a low level, which provides a low signal on the D input of flip-flop 122, which is clocked by the signal on line 102. The output of this flip-flop on line 124 sets the flip-flop 116, which causes the line 120 to be switched low, thereby, terminating the play 2 command coupled to the capstan servo 300 (FIG. 4) to enable the capstan motor drive amplifier 349 to be driven.

In accordance with yet another aspect of the present invention, if the record and reproduce apparatus is operating in a slow motion reproduce mode with the tape transported at a relatively slow velocity, it should be appreciated that a field match condition signal may be generated by the comparator 106 and the play command clocked thereby through the flip-flop 116 in the manner as previously described. However, as the velocity of the capstan increases, the difference between the reference and reproduced video related field identification signals on lines 108 and 110 will gradually approach one another. When this condition occurs, it takes longer for the reference and reproduced video related field identification signals to match, hence, for a field match signal to be generated by the comparator 106. When the slow motion velocity exceeds approximately one-half the normal reproduce tape velocity, it is desirable to not utilize the field match to clock the play command to the capstan servo 300. Under these operating conditions, the circuitry of FIGS. 9A and 9D effectively gate the play command immediately to the capstan servo rather than wait for a field match signal to be generated. This is accomplished by circuitry illustrated in FIG. 9A by applying the capstan tachometer signal on line 130 to a monostable multivibrator or one-shot 132 and, in addition to the clock input of a D flip-flop 134, so that if the output of the one-shot 132 appearing on line 136 fails to time out prior to the occurrence of a subsequent tachometer pulse, the D input of the flip-flop 134 remains low. This low state is clocked through the flip-flop 134, providing a high signal on the output line 138 that is applied to an AND gate 140 (FIG. 9D). This high signal is ANDed with the play command to cause output line 142 to go high. This high signal is gated through OR gate 144 onto line 146 which resets the flip-flop 116 and, thereby, provides the play 2 command on line 120 which causes the capstan servo to be activated.

Turning now to the details of the phase comparator circuitry 13 shown in FIGS. 8D and 8C, the play 2 command on line 120 is applied to the lower left portion of the circuitry of FIG. 8D. This line extends to a switch 150 (FIG. 8C) to cause it to move to the position as shown, wherein reference clock signals from input line 20' (FIG. 8D) are applied to line 20'' (FIG. 8C) and gated through AND gate 152 to line 20 for clocking the reference counter 18. The tape transport command and capstan-not-stopped signal are received over lines 111 and 113, respectively, as previously described. The AND gate 152 is enabled by line 154 when AND gate 115 receives such command and signal, which indicate the tape is commanded to be transported and the reel servo (not shown) is active to transport the tape, respectively. Thus, when the play 2 command is generated, the reference counter 18 (FIGS. 6 and 8C) will begin counting and will cause an error signal to be generated by the summing circuit 22 since the capstan and tape are not moving at that instant. After the capstan has accelerated the transport of the tape to the normal reproduce tape velocity, the error signal on line 32 (FIG. 8C) becomes zero. The signal on line 32 is coupled via an amplifier 117 to line 32' and is applied to the inputs of the comparators 46 and 48 and also applied to comparators 154 and 156. The comparators 154 and 156 serve to compare the error signal to references, similar as comparators 46 and 48, and thereby provide tolerance comparison when the capstan is driven to transport the tape at the normal reproduce tape velocity. Upon reaching this condition of tape transport, the output lines 158 and 160 of the two comparators 154 and 156 are switched low and a following OR gate 162 provides a low signal on line 164 indicating the capstan is servo locked with the tape transported at the normal reproduce tape velocity.

The detailed schematic diagrams of the stop servo circuitry 320 described hereinbefore with reference to FIG. 7 is largely shown in FIGS. 9C and 9B. When the record and reproduce apparatus control circuitry, which does not in and of itself form a part of the present invention, detects that the capstan and transport of the tape is to be stopped from a noncontrol track locked mode of operation, a stop servo command is applied via line 170, shown in the lower left portion of FIG. 8B, and this signal switches a switch 172 (FIG. 8C) to its alternate position whereby the stop servo capstan drive direction signal on line 92 extending from FIG. 8D is applied to control the up/down reference counter 18, as previously described. The stop servo command also controls a switch 119 (FIG. 9A) to switch the reference clock line 88' between the clock signal provided by the stop servo VCO 320 (FIGS. 4 and 7) over line 88 and the controllable velocity reference clock signal provided over line 121, the later clock signal being provided to the capstan tach error detector 347 (FIG. 4) during operating modes when tape is transported under noncontrol track servo lock conditions, as previously described.

The stop servo reference clock signal is applied through the switch 150 (FIG. 8C), which is placed in the alternate position so that the clock signal is applied to clock the up/down reference counter 18. In this manner, the phase comparator circuitry 13 (FIG. 6) will effectively cause the error signals to be generated to reposition the tape so that the control track transition locations are located in a known position relationship relative to the nominal plane of rotation of the displaceable video reproduce head. Furthermore, the operation of the aforedescribed automatic head position tracking servo 400 (FIG. 10) during this stop servo operation results in the displaceable video reproduce head 402 being returned to the nominal plane of head rotation by the supporting movable element 401. This permits the automatic head position tracking servo 400 to utilize its full dynamic range. In addition, returning the displaceable head 402 to the nominal plane of rotation enables the head 402 to follow the tracks of recorded video information during subsequent acceleration of the transport of the tape in a manner as has been described with respect to the diagram of FIG. 3. On the other hand, if the tape is not so positioned and the movable element is deflected to a position approaching a limit of its dynamic range, then the movable element 401 may be unable to deflect a sufficient amount to maintain appropriate head tracking. The stop servo circuitry effectively places the tape so that the automatic head position tracking servo 400 functions properly during subsequent acceleration of the transport of the tape to the normal reproduce tape velocity, as is desired.

From the foregoing, it should be appreciated that a significantly improved tape transport servo system and associated circuitry have been described which enables superior performance of a tape recording and reproducing apparatus. The apparatus of the present invention permits color frame synchronization to be achieved responsive to a play command from a still field reproduce mode almost instantaneously. Moreover, the stop servo circuitry of the present invention automatically operates to correctly position the tape for such instantaneous synchronization when the transport of the tape is stopped from a noncontrol track locked operating mode.

It should be understood that although preferred embodiments of the present invention have been illustrated and described, various modifications thereof will become apparent to those skilled in the art, and, accordingly, the scope of the present invention should be defined only by the appended claims and equivalents thereof.

Various features of the invention are set forth in the following claims.

What is claimed is:

1. A method of achieving synchronous reproduction of recorded video information relative to a reference when changing the velocity of transport of a tape from a predetermined velocity to a normal velocity at which video information is reproduced from the tape, the predetermined velocity less than the normal velocity, the video information including picture information in a sequence of field intervals and a recurring sequence of a plurality of field identification information each identifying a distinct field interval, the tape transported in a helical path about a tape guide as video information recorded along tracks on the tape is reproduced by at least one rotating transducing head, a capstan for effecting the transport of the tape, said method comprising the steps of:
- comparing the field identification information included in video information reproduced from the tape with a recurring sequence of reference field identification information each identifying a distinct reference field interval of a recurring sequence of a plurality of distinct reference field intervals, the distinct reference field intervals occurring at a stable rate and the recurring sequence thereof corresponding to the recurring sequence of distinct field intervals of video information;
- activating said capstan to change the velocity of the tape transport from the predetermined velocity to the normal velocity when the compared field identification information identify a coincidence of a distinct field interval of video information reproduced from the tape and a corresponding distinct reference field interval occurring in the sequence of distinct reference field intervals;
- comparing the phase of the capstan with the phase of a stable reference signal as the velocity of transport of the tape is changed and generating an error signal indicative of the phase differrence between the compared phases; and
- controlling the capstan in accordance with the error signal to adjust the transport of the tape to eliminate the phase difference.

2. A method as defined in claim 1 wherein the rotating transducing head is mounted on a movable element for displacing the transducing head transversely relative to the longitudinal direction of the tracks of video information, the movable element is controlled by a head tracking position servo to cause the transducing head to follow tracks as video information are reproduced therefrom at various velocities of tape transport, and further comprising the step of activating the head tracking position servo to control the movable element during the change in the velocity of tape transport to cause the transducing head to follow the recorded tracks of video information consecutively in succession.

3. A method as defined in claim 1 wherein said predetermined velocity is less than approximately one-half the normal velocity.

4. A method as defined in claim 1 wherein said video information is a NTSC color video information signal, said field identification information comprising information identifying even and odd fields of two consecutive fields forming a frame and even and odd frames of two consecutive frames of a four field sequence forming the recurring sequence of a plurality of distinct field intervals.

5. A method as defined in claim 1 wherein the capstan is activated to change the velocity of the tape transport when a coincidence occurs with respect to a particular reference field interval of the sequence of distinct reference field intervals.

6. A method as defined in claim 5 wherein said video information is a NTSC color video information signal and said recurring sequence of a plurality of distinct field intervals comprises four consecutive fields.

7. A method as defined in claim 5 wherein said video information is a PAL color video information signal and said recurring sequence of a plurality of distinct fields comprises eight consecutive fields.

8. A method of stopping the transport of a tape in a video tape recording and reproducing machine with a control track transition recorded longitudinally along the tape located at a predetermined position relative to a transducer for transferring information with respect to the tape, the operation of the machine controlled in accordance with reference signals including a recurring sequence of reference field identification signals each identifying a distinct reference field interval of a plurality of distinct reference field intervals occurring at a stable rate, the transport of the tape effected by a capstan, the method comprising the steps of:
- issuing a stop command to effect stopping of the transport of the tape;
- decelerating the transport of the tape to stop in response to the occurrence of a reference field identification signal identifying a predetermined one of the reference field intervals following the issuance of the stop command;
- comparing the phase of the capstan to the phase of a stable reference signal during the deceleration of the transport of the tape; and
- controlling the capstan in accordance with the phase comparison to adjust the transport of the tape to eliminate any phase difference between the compared signals as the transport of the tape is decelerated and stopped to locate the control track transition at the predetermined position.

9. Apparatus for achieving synchronous reproduction of recorded video information relative to a reference when changing the velocity of transport of a tape from a predetermined velocity to a normal velocity at which video information is reproduced from the tape, the predetermined velocity less than the normal velocity, the video information including picture information in a sequence of field intervals and a recurring sequence of a plurality of field identification information each identifying a distinct field interval, the tape transported in a helical path about a tape guide as video information recorded along tracks on the tape is reproduced by at least one rotating transducing head, a capstan for effecting the transport of the tape, said apparatus comprising:
- means for comparing the field identification information included in the video information reproduced from the tape with a recurring sequence of corresponding reference field identification information each identifying a distinct reference field interval of a plurality of distinct reference field intervals and generating a match signal when the compared field identification information identify a coincidence of a distinct field interval of video information reproduced from the tape and a corresponding distinct reference field interval occuring in the sequence of distinct reference field intervals;
- means responsive to the generation of the match signal for driving the capstan to change the velocity of transport of the tape to a velocity corresponding to the normal velocity of transport of the tape;
- means for comparing the phase of the capstan with the phase of a stable reference signal and generating an error signal indicative of the difference between the compared phases; and
- means responsive to the error signal for adjusting the drive of the capstan to eliminate the phase difference.

10. Apparatus as defined in claim 9 wherein the rotating transducing head is mounted on a movable element for displacing the transducing head transversely relative to the longitudinal direction of the tracks of video information, and further comprising means for controlling the movable element during the change in the velocity of tape transport to cause the transducing head to follow the recorded tracks of video information consecutively in succession.

11. Apparatus as defined in claim 9 wherein said predetermined velocity is less than approximately one-half the normal velocity.

12. Apparatus as defined in claim 9 wherein said means for comparing field identification information and generating a match signal comprises a multi-bit binary signal comparator, said field identification information is applied to one input of said comparator in the form of a first binary signal and said reference video field identification information is applied to a second input of said comparator in the form of a second binary signal, said comparator providing the match signal in response to said binary signals representing corresponding binary numbers.

13. Apparatus as defined in claim 9 further comprising a flip-flop having a clock input and a signal input, the clock input coupled to receive the match signal and the signal input coupled to receive a velocity change command signal, said flip-flop coupling the velocity change command to enable the capstan drive means when clocked by said match signal.

14. Apparatus for stopping the transport of a tape in a tape recording and reproducing apparatus with a control track transition recorded longitudinally along the tape located at a predetermined position relative to a transducer for transferring information with respect to the tape, the operation of the apparatus controlled in accordance with reference signals including a recurring sequence of reference field identification signals each identifying a distinct reference field interval of a plurality of distinct reference intervals occurring at a stable rate, the transport of the tape effected by a capstan, the apparatus comprising:
  means for decelerating the transport of the tape to stop in response to a stop command;
  means for comparing the phase of the capstan to the phase of a stable reference signal during the deceleration of the transport of the tape and generating an error signal indicative of the difference in compared phases; and
  means for controlling the capstan in accordance with the error signal as the transport of the tape is decelerated and stopped to locate the control track transition at the predetermined position.

15. Apparatus as defined in claim 14 wherein the means for decelerating the transport of the tape is responsive to the occurrence of a reference field identification signal identifying a predetermined one of the reference intervals following the occurrence of the stop command to commence decelerating the transport of the tape.

16. Apparatus for positioning a tape in a video tape recording and reproducing apparatus with a control track transition recorded longitudinally along the tape at a predetermined position relative to the nominal plane of rotation of a rotating head for reproducing video information from the tape, the rotating head mounted on a movable element for displacing the head transversely relative to the longitudinal direction of tracks along which the video information is recorded synchronously relative to the control track transitions, the movable element controlled by a head position tracking servo to cause the head to follow the tracks as video information are reproduced therefrom when the tape is transported at a velocity other than the normal record and reproduce velocity, the recorded video information including synchronizing signals which are reproduced from the tape by the rotating head, comprising:
  means for stopping the transport of the tape in response to a stop command;
  means responsive to the reproduction of a selected synchronizing signal after the tape is stopped and a reference timing signal for generating an error signal indicative of a phase error in the selected synchronizing signal relative to the reference timing signal; and
  means responsive to the error signal for generating a tape transport drive signal for effecting movement of the tape a distance and in a direction to eliminate the indicated phase error.

17. Apparatus as defined in claim 16 wherein said error signal has a magnitude and sense indicative of the magnitude and sense, respectively, of the phase error, and said tape transport drive signal generating means includes;
  means for integrating the error signal to generate an integrated output signal;
  means for comparing said integrated output signal with a positive reference level and providing a first signal to the intergrating means for reducing the magnitude of the integrated output signal as long as the magnitude of the integrated output signal exceeds the positive reference level;
  means for comparing said integrated output signal with a negative reference level and providing a second signal to the integrating means for reducing the magnitude of the integrated output signal as long as the magnitude of the integrated output signal exceeds the negative reference level; and
  means for generating a pulse drive signal and drive direction signal in accordance with the provided first and second signals to effect movement of the tape said distance and in said direction to eliminate the indicated phase error.

18. Apparatus for changing the velocity of transport of a tape to a selected velocity in accordance with a reference timing signal identifying periodically occurring intervals, said tape having an information signal recorded thereon which information signal contains a timing component that identifies periodically occurring intervals of the information signal corresponding to the periodically occurring intervals defined by said reference timing signal and from which the velocity, of tape transport can be determined, and a magnetic head mounted for rotation in a nominal plane of rotation located at a position relative to the transported tape for reproducing the recorded information signals, comprising:
  means for detecting a selected time relationship between an identifiable interval of the reference timing signal and a corresponding identifiable interval of the timing component contained in the reproduced information signal and generating a command signal indicative of the detection of the selected time relationship; and
  means for controlling the velocity of transport of the tape responsive to said command signal to cause the velocity of tape transport to be changed at a rate for a velocity change interval that results in a displacement of the tape at the end of said velocity change interval equal to that of a tape being transported at the selected velocity for the velocity change interval as adjusted for any residual displacement of the magnetic head relative to said nominal plane of rotation at the end of the velocity change interval.

19. Apparatus as in claim 18 further comprising means for retaining a number corresponding to the difference in intervals between said reference timing signal and said information signal timing component during the interval that the velocity of transport of the tape is changed, and wherein said velocity controlling means is operative to terminate the change of the velocity of transport of the tape when the tape is at said selected velocity and the number retained by said difference retaining means corresponds to an absence of a difference in intervals between said reference timing signal and said information signal timing component.

20. Apparatus as in claim 19 wherein upon generation of said command signal the tape is transported at an initial velocity less than said selected velocity, and said velocity controlling means includes means for increasing the velocity of tape transport to a value greater than said selected velocity during the velocity change interval.

21. Apparatus as in claim 20 wherein said initial velocity is zero.

22. Apparatus as in claim 18 wherein upon generation of said command signal the tape is transported at an initial velocity greater than said selected velocity, and said velocity controlling means includes means for decreasing the velocity of tape transport to a value less than said selected velocity during the velocity change interval.

23. Apparatus as in claim 18 wherein upon generation of said command signal the tape is transported at an initial velocity whose direction is opposite the direction corresponding to said selected velocity, and said velocity controlling means includes means for changing the velocity of tape transport to a value greater in magnitude and corresponding in direction to said selected velocity during the velocity change interval.

24. Apparatus as in claim 18 wherein the velocity of transport of the tape is reduced from a non-zero velocity to a zero velocity, and further comprising means for adjusting the position of the tape relative to the position of the plane of rotation of the magnetic head at zero velocity for alignment of a selected one of said periodically occurring intervals of the information signal recorded on the tape with the plane of the rotation of the magnetic head.

25. Apparatus for changing the velocity of transport of a tape to a selected velocity in accordance with a reference timing signal identifying periodically occurring intervals, said apparatus providing a system timing signal indicative of the rate of reproduction of information recorded on the tape relative to the reference timing signal, the system timing signal identifying periodically occurring intervals of information recorded on the tape corresponding to the periodically occurring intervals defined by said reference timing signal and from which the velocity of tape transport can be determined, and a magnetic head mounted for rotation in a nominal plane of rotation located at a position relative to the transported tape for reproducing the recorded information signals, comprising:

means for controlling the velocity of transport of the tape responsive to a velocity change command signal to cause the velocity of tape transport to be changed at a rate for an interval productive of a displacement of the tape at the end of said interval proportional to the product of the change in velocity of tape transport and of said interval as adjusted for any residual displacement of the magnetic head relative to said nominal plane of rotation at the end of said interval, and means responsive to the transport of the tape reaching the selected velocity to terminate the change in velocity of the transport of the tape.

* * * * *